(12) United States Patent
Ueda et al.

(10) Patent No.: US 8,106,990 B2
(45) Date of Patent: Jan. 31, 2012

(54) IMAGING DEVICE WITH OUTPUT PROCESSING MODULE

(75) Inventors: Takenori Ueda, Mie (JP); Yoshihiko Nakayama, Anjyo (JP); Tetsuro Kato, Nagoya (JP); Naoko Kajima, Aichi (JP)

(73) Assignee: Elmo Company Limited (JP)

( * ) Notice: Subject to any disclaimer, the term of this patent is extended or adjusted under 35 U.S.C. 154(b) by 377 days.

(21) Appl. No.: 12/277,793

(22) Filed: Nov. 25, 2008

(65) Prior Publication Data

US 2009/0167918 A1 Jul. 2, 2009

(30) Foreign Application Priority Data

Dec. 28, 2007 (JP) ................................ 2007-339773

(51) Int. Cl.
*H04N 5/222* (2006.01)
(52) U.S. Cl. .................................................. 348/333.01
(58) Field of Classification Search ............. 348/333.01, 348/333.11, 333.02
See application file for complete search history.

(56) References Cited

U.S. PATENT DOCUMENTS

| | | | |
|---|---|---|---|
| 2004/0239686 A1* | 12/2004 | Koyama et al. | ............... 345/620 |
| 2005/0235228 A1 | 10/2005 | Hashimoto et al. | |
| 2005/0237411 A1* | 10/2005 | Watanabe | ................ 348/333.02 |
| 2007/0286596 A1* | 12/2007 | Lonn | .............................. 348/552 |
| 2008/0055564 A1 | 3/2008 | Chang et al. | |
| 2008/0174687 A1* | 7/2008 | Shimizu | .................... 348/333.02 |
| 2008/0225154 A1* | 9/2008 | Pan et al. | ................. 348/333.02 |

FOREIGN PATENT DOCUMENTS

| | | |
|---|---|---|
| JP | 8-336129 | 12/1996 |
| JP | 2002-281467 | 9/2002 |
| JP | 2002-341438 | 11/2002 |
| JP | 2005-311598 | 11/2005 |
| JP | 2006-311063 | 11/2006 |

OTHER PUBLICATIONS

Search Report issued Mar. 9, 2009 in connection with corresponding UK patent application No. GB0821475.1.

\* cited by examiner

*Primary Examiner* — Gevell Selby
(74) *Attorney, Agent, or Firm* — Ostrolenk Faber LLP

(57) ABSTRACT

In response to a power-on of a main switch, a composite image comprising a menu image including multiple command icons for device settings, and a source image from a currently set image input source as a background image, is displayed on an internal monitor of an imaging device. The user can thus select desired command icons for device settings among the multiple command icons in the menu image, while visually checking the background source image. Only the source image without the menu image is displayed on an external display device, which is used for a presentation given to the audience. This arrangement desirably improves the usability of the imaging device, while preventing the display of the menu image on the external display device from damaging the effect of the presentation given to the audience.

8 Claims, 15 Drawing Sheets

Display | Start Slide Show | Slide Show Setting | Initialize

_US 8,106,990 B2_

IMAGING DEVICE WITH OUTPUT PROCESSING MODULE

CROSS-REFERENCE TO RELATED APPLICATIONS

The present application claims the priority based on Japanese Application P2007-339773 filed on Dec. 28, 2007, the disclosure of which is hereby incorporated by reference in its entirety.

BACKGROUND

1. Technical Field

The present invention relates to an imaging device configured to take an image in a predetermined imaging area with a camera unit and displaying the camera-taken image on a display unit.

2. Related Art

In general application of imaging devices, an image in a predetermined imaging area, for example, an imaging object placed on a table, is taken with an internal camera of a camera unit and is displayed on a display unit. This application enables the user of the imaging device to give a presentation, while conveniently checking the conditions of the camera-taken image. One proposed technique for the imaging device uses command icons included in a menu image displayed on the display unit for setting various working conditions of the imaging device, for example, brightness adjustment, white balance adjustment, and image edge adjustment for image taking with the camera unit (see, for example, Japanese Patent Laid-Open No. 2004-120374).

The imaging device of this proposed structure adopts software setting keys to display command icons representing various commands for device settings on the display unit and select a desired command icon by the user's operation of a command pointer, for example, an infrared light pen, on the display unit.

When the user touches the menu image on the display unit with the command pointer, such as the light pen, this prior art imaging device detects the position of the touch by taking the image of the display unit with the camera unit and activates a command specified by the detected touch position. The same camera unit is used for taking the image of each imaging object for the presentation and for taking the image of the display unit to detect the touch position. On every occasion of the device settings, the user is thus required to change the attitude of the camera unit from the position for taking the image of the imaging object to the position for taking the image of the display unit. This is rather time-consuming and troublesome. The proposed technique combines the menu image with the camera-taken image to generate a composite image and displays the composite image on the display unit. Since a change of the attitude of the camera unit is required on every occasion of the device settings, the camera-taken image as a subject of composition with the menu image is naturally an image taken with the camera unit prior to its attitude change. The imaging object shown to the audience is generally replaced in the course of a presentation. The camera-taken image combined with the menu image may thus be different from the image actually taken with the camera unit at the moment. Such a difference causes the user to feel odd and uncomfortable and lowers the usability of the imaging device. The proposed technique displays the composite image even on a projector, which is shown to the audience of the presentation. The audience is then notified of the device settings by the user's selection of corresponding command icons. This undesirably damages the effect of the presentation.

In order to solve the problem of the prior art, there would be a demand for adopting software operation keys for device settings to improve the usability, while preventing a damage of the effect of presentation given to the audience.

SUMMARY

In order to solve at least a part of these problems stated above, the present invention uses the following constitution.

According to one aspect, the present invention is directed to an imaging device equipped with a camera unit constructed to take an image in a predetermined imaging area and with a display unit used for image display. The imaging device has: a command display module configured to generate a composite image by combining a camera-taken image output from the camera unit with a menu image including multiple command icons, which are to be selected for device settings, and to display the generated composite image on the display unit; a command operation unit provided on the imaging device and operated to select one of the multiple command icons included in the menu image of the composite image displayed on the display unit; a processor configured to perform a processing operation specified by the selected command icon; and an output processing module configured to output the camera-taken image output from the camera unit to an external display device without combining with the menu image.

In the imaging device according to this aspect of the invention, the camera-taken image output from the camera unit is displayed on the display unit by the command display module, while being simultaneously displayed on the external display device by the output processing module. The camera-taken image is combined with the menu image including the multiple command icons selected for the device settings. While the resulting combined image is displayed as the composite image on the display unit, only the camera-taken image without the menu image is displayed on the external display device. The composite image of the camera-taken image with the menu image is accordingly not shown to the audience of a presentation given with the imaging device. The user of the imaging device can, on the other hand, select a desired command icon among the multiple command icons included in the menu image on the display unit by operating the command operation unit provided on the imaging device, while visually checking the camera-taken image as the background image on the display unit. The processor performs the processing operation specified by the selected command icon.

The imaging device of this configuration does not require the user to change the attitude of the camera unit for the device settings. The user can perform the device settings by simply operating the command operation unit provided on the imaging device, while visually checking the composite image of the menu image with the camera-taken image as the background displayed on the display unit. The background image of the composite image displayed on the display unit is the camera-taken image actually taken with the camera unit during the user's operation of the command operation unit for the device settings. The user can operate the command operation unit for the device settings, while visually checking the camera-taken image actually taken with the camera unit at the moment as the background of the composite image displayed on the display unit in the course of a presentation with replacement of imaging objects. This arrangement effectively prevents the user from feeling odd or uncomfortable. Only the camera-taken image actually taken with the camera unit at the moment is shown to the audience of the presentation. The configuration of the imaging device of the invention accordingly allows the software device settings and improves the usability by the user's simple selection of desired command icons in the composite image displayed on the display unit, while preventing a damage of the effect of the presentation given to the audience.

The imaging device according to the above aspect of the invention may adopt any of various arrangements and structures. In one preferable embodiment of the invention, the imaging device further has an image input module configured to input an image. The command display module combines the menu image, which includes multiple image selection command icons corresponding to the camera-taken image and an input image by the image input module, with an image corresponding to one of the multiple image selection command icons in the menu image selected by an operation of the command operation unit to generate the composite image and displays the generated composite image on the display unit. The output processing module outputs the image corresponding to the selected image selection command icon to the external display device. The user can thus readily change over the image displayed on the external display device between the camera-taken image output from the camera unit and the input image by the image input module, while visually checking the composite image of the menu image with the currently displayed image as the background on the display unit. The audience of the presentation does not specifically note the user's selection of a desired command icon by the operation of the command operation unit for a changeover of the displayed image. This arrangement ensures the effect of the presentation. The image input module may read an image as the input image from a storage medium for storing at least one image. This arrangement allows a easy changeover of the image displayed on the external display device between the camera-taken image and the image read from the storage medium, while ensuring the effect of the presentation.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
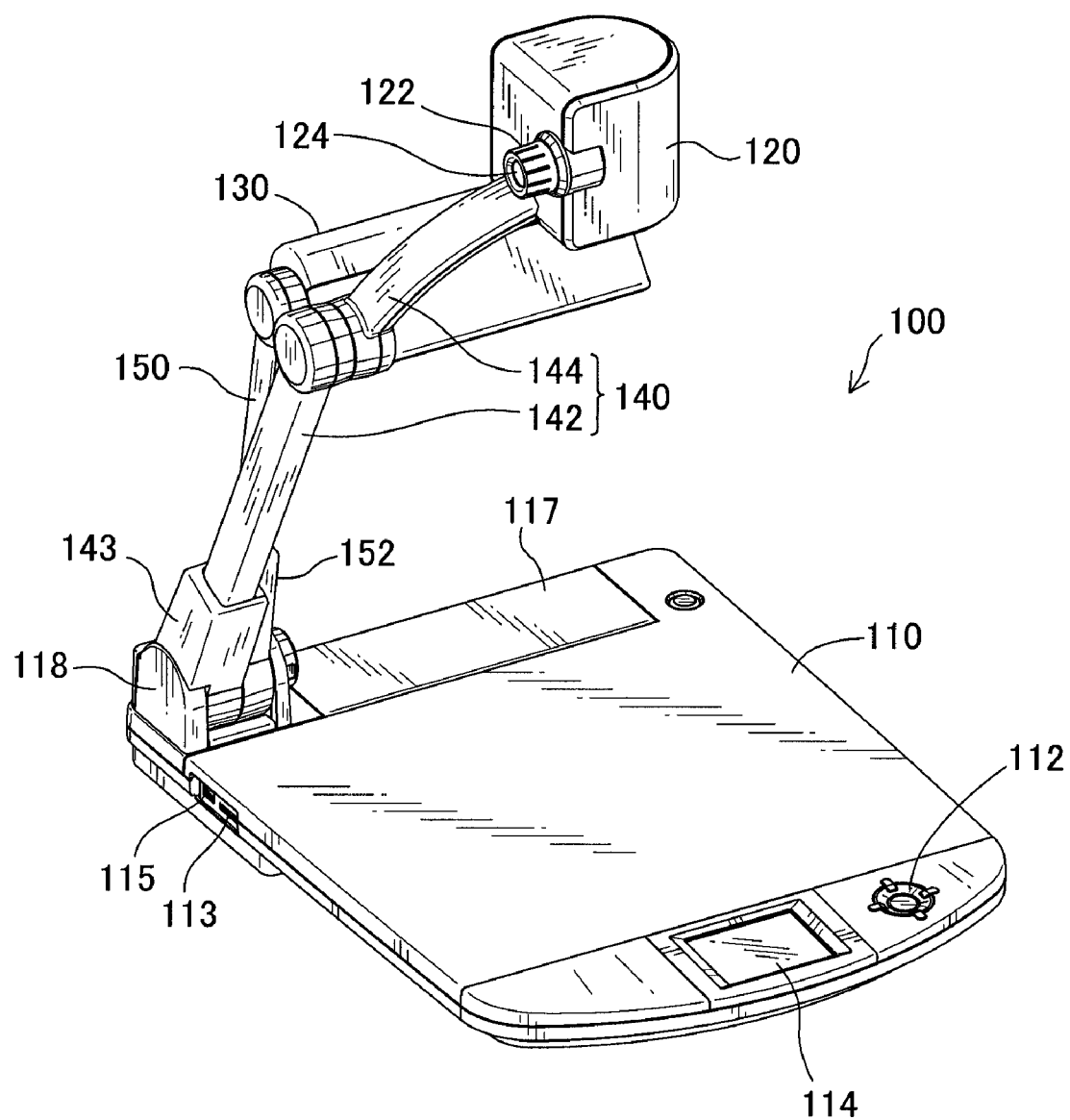
FIG. 1 is a perspective view showing an imaging device 100 in one embodiment of the invention.

One mode of carrying out the invention is described below as a preferred embodiment with reference to the accompanied drawings. FIG. 1 is a perspective view showing an imaging device 100 in one embodiment of the invention.

As illustrated, the imaging device 100 includes a table 110 designed to enable an imaging object (not shown) to be placed thereon, a camera head 120 used to take an image of the imaging object placed on the table 110, and a lighting unit 130 designed to illuminate the imaging object placed on the table 110. The table 110 is a plate in a rectangular shape having rounded front corners and has an inclined surface 110FS formed on the front side of the top face of the table 110. The inclined surface 110FS has a switch assembly 112 and a monitor 114. A memory card insertion mechanism 113 and a USB (universal serial bus) terminal 115 are provided on a left rear side wall of the table 110. The switch assembly 112 has multiple switches for setting illumination on and off, switching over a source image for monitor display, switching over a display mode of a menu image on the monitor 114, and setting the functions of the imaging device 100 as described in detail later.

The table 110 has a cover 117 provided in a freely opening and closing manner on the rear end of the top face of the table 110. The cover 117 is closed to cover over connector terminals for connection with external devices. The cover 117 opens and closes as a flap. In the illustrated closed position, the top face of the cover 117 is substantially in the same plane as and practically continuous with the top face of the table 110. The connector terminals covered over by the cover 117 include an RGB input terminal 401 for inputting images from a personal computer or another equipment of outputting image signals, an RGB output terminal 402 for outputting images as RGB analog signals to an analog display device, a DVI (digital visual interface) output terminal 403 for outputting images as digital signals to a digital display device, and a general-purpose video terminal 404 shown in FIG. 5.

The camera head 120 is supported by a camera support arm 140 on the table 110. The camera support arm 140 includes a table side arm member 142 and a camera side arm member 144 and is held on a base 143 of the table side arm member 142 to be pivotally movable relative to the table 110. The camera side arm member 144 is linked with and fastened to the camera head 120 and is pivotally movable about a joint relative to the table side arm member 142. The camera head 120 integrated with the camera side arm member 144 is thus pivotally movable on the end of the table side arm member 142.

The camera head 120 includes a built-in camera (not shown) and has a zoom control switch 122 and an auto focus switch 124 provided on its side face as switches frequently operated for taking an image of the imaging object. The zoom control switch 122 is provided to surround the auto focus switch 124 and is rotated clockwise and counterclockwise by the user to set a desired zoom. The auto focus switch 124 is a press switch and is generally set in an auto focus off state. The user presses the auto focus switch 124 to enable an auto focus function.

The lighting unit 130 is supported by a lighting unit support arm 150 on the table 110. The lighting unit support arm 150 is held on its base 152 to be pivotally movable relative to the table 110. The lighting unit 130 mounted on the end of the lighting unit support arm 150 is thus pivotally movable relative to the table 110.

The camera support arm 140 and the lighting unit support arm 150 are coaxially supported in a pivotally movable manner on a raised element 118 provided on a left rear corner of the table 110 and are coaxially moved relative to the table 110 to change the degree of inclination to the table 110.

Figure 2:
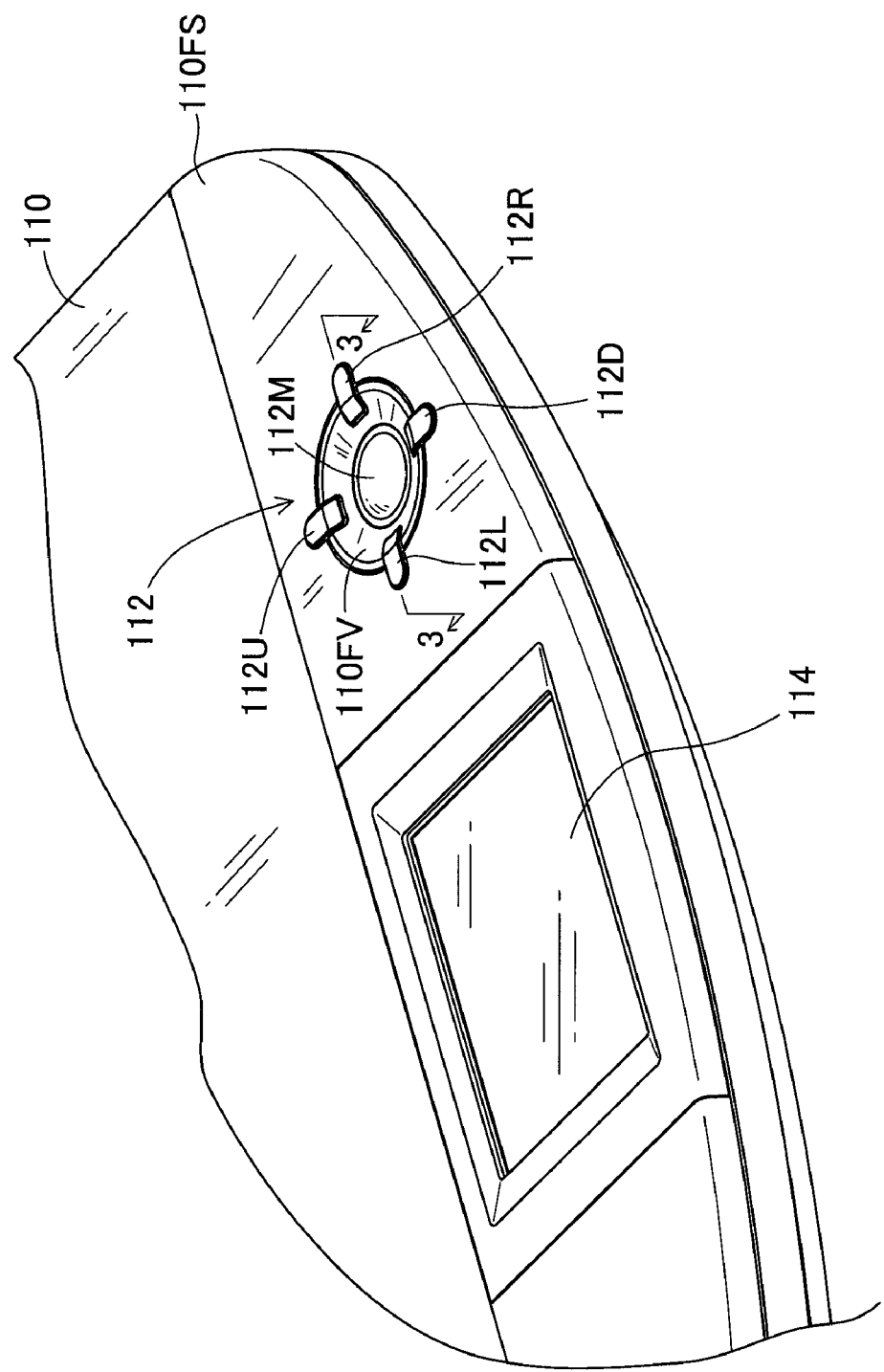
FIG. 2 is an enlarged perspective view showing periphery of a switch assembly 112 on the imaging device of FIG. 1.
Figure 3:
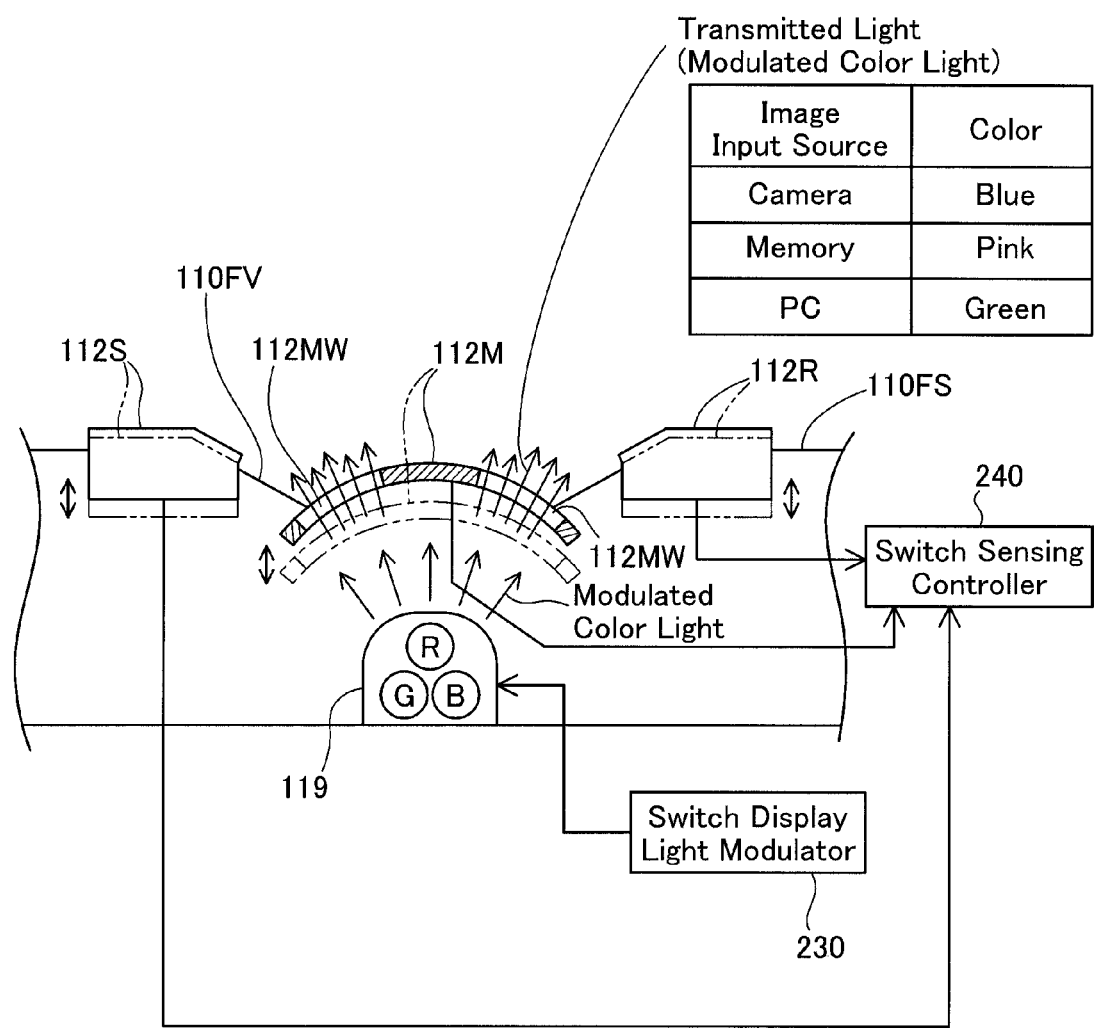
FIG. 3 is a sectional view showing the periphery of the switch assembly 112 taken on a line 3-3 in FIG. 2.

The switch assembly 112 mounted on the imaging device 100 is described in detail below. FIG. 2 is an enlarged perspective view showing periphery of the switch assembly 112. FIG. 3 is a sectional view showing the periphery of the switch assembly 112 taken on a line 3-3 in FIG. 2.

As illustrated, the monitor 114 is located on the substantial center of the inclined surface 100FS. The switch assembly 112 on the right side of the monitor 114 includes a menu switch 112M provided on the center of a tapered recess 110FV, as well as an up switch 112U, a down switch 112D, a right switch 112R, and a left switch 112L arranged on the tapered recess 110FV to surround the menu switch 112M. These switches are press switches to be pressed and returned to their original positions by resilient elements or other equivalent elements. In response to the user's press of each of these switches, a corresponding signal is output to a switch sensing controller 240 (described later). In the description hereafter, the up switch 112U, the down switch 112D, the right switch 112R, and the left switch 112L arranged to surround the menu switch 112M are collectively referred to as the circumferential switches, while being individually explained by these names.

The menu switch 112M is formed in an upward convex arc and has a translucent window 112MW arranged between its top and circumference. A modulated light source 119 including R, G, and B light emitting diodes (LEDs) is located under the menu switch 112M. The modulated light source 119 emits modulated color light under control of a switch display light modulator 230. The modulated color light emitted from the modulated light source 119 is transmitted through the translucent window 112MW. The user operating the menu switch 112M visually checks the color of the light transmitted through the translucent window 112MW. In the imaging device 100 of the embodiment, the user operates the right switch 112R, the left switch 112L, and the down switch 112D and sets a command to select an image input source among the camera head 120, an external device (for example, a personal computer), and a memory as discussed later. The color of the light emitted from the modulated light source 119 is modulated corresponding to each option of the image input source. For example, the light emitted from the modulated light source 119 is modulated to blue light corresponding to the camera head 120 as the option of the image input source, to pink light corresponding to the memory, and to green light corresponding to the external device (personal computer). The user checks the color of the light transmitted through the translucent window 112MW of the menu switch 112M to readily identify the current image input source among the available options, the camera head 120, the external device (personal computer), and the memory.

Figure 4:
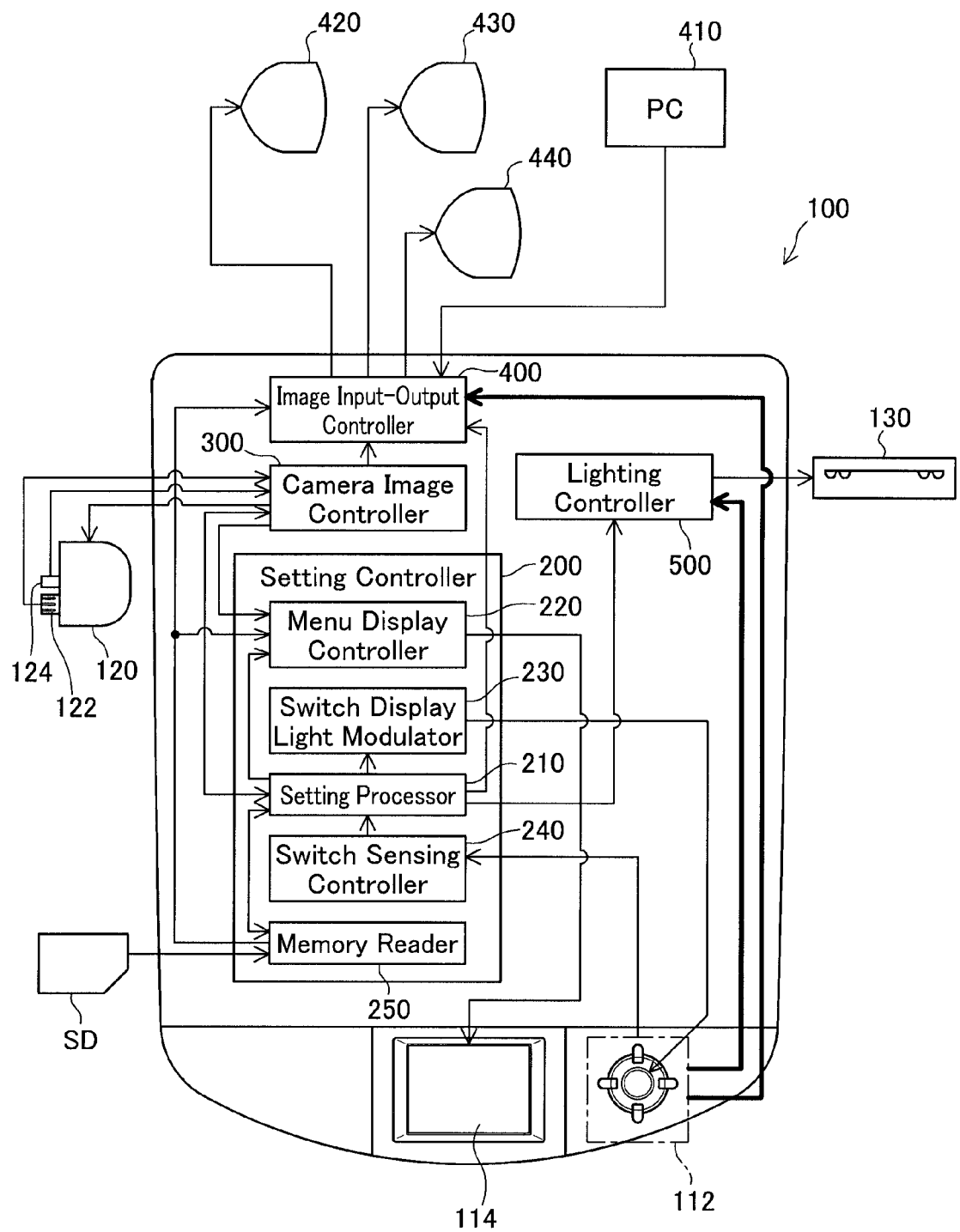
FIG. 4 is a functional block diagram showing the schematic structure of the imaging device 100.
Figure 5:
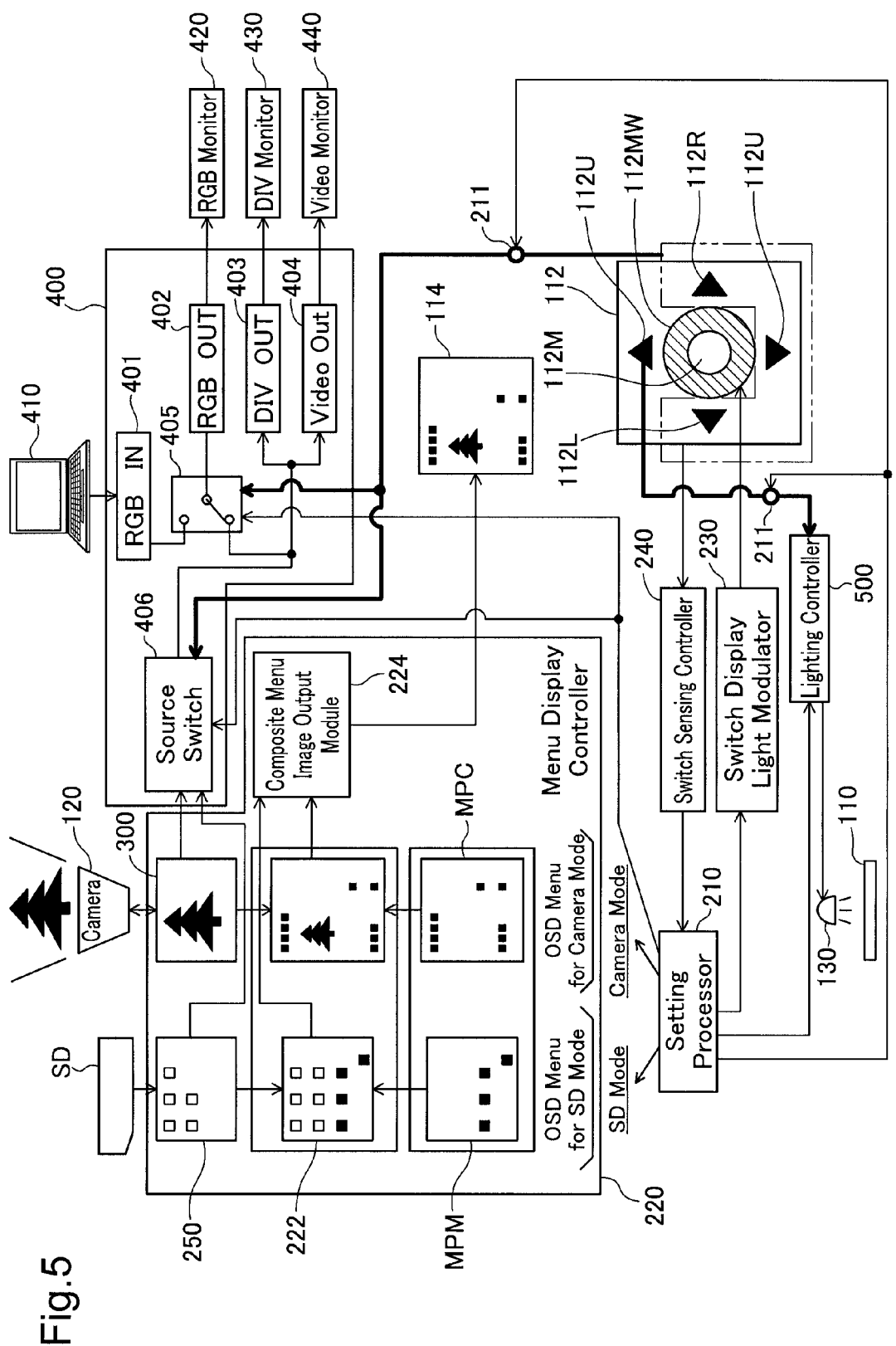
FIG. 5 is a block diagram showing the functions and the relations of the respective functional blocks.

The functions of the imaging device 100 of the embodiment are discussed below. FIG. 4 is a functional block diagram showing the schematic structure of the imaging device 100. FIG. 5 is a block diagram showing the functions and the relations of the respective functional blocks.

As illustrated, the imaging device 100 includes a setting controller 200, a camera image controller 300, an image input-output controller 400, and a lighting controller 500. The setting controller 200 takes overall control of the imaging device 100 and is constructed by a microcomputer including a CPU, a ROM, and a RAM. The setting controller 200 executes programs (not shown) to attain the functions of a setting processor 210, a menu display controller 220, the switch display light modulator 230, the switch sensing controller 240, and a memory reader 250.

The image input-output controller 400 controls input of an image (PC image) in the form of an RGB analog signal from a personal computer 410 connecting with the RGB input terminal 401, output of an image to an RGB analog monitor 420 connecting with the RGB output terminal 402, output of an image to a digital monitor 430 connecting with the DVI output terminal 403, and output of an image to a video monitor 440 connecting with the video terminal 404. The image input-output controller 400 also controls signal switchover to the RGB output terminal 402 by an input switch 405 and changeover of the image input source by a source switch 406. The signal switchover by the input switch 405 and the source changeover by the source switch 406 are performed in response to a control signal from the setting processor 210 or in response to the user's operations of the right switch 112R, the left switch 112L, and the down switch 112D functioning as source changeover switches as explained later. The signal switchover and the source changeover will be discussed later. In the description hereafter, the RGB analog monitor 420, the digital monitor 430, and the video monitor 440 are collectively referred to as the external monitor, while being individually explained by these names.

The lighting controller 500 controls on and off illumination of the lighting unit 130 in response to a control signal from the setting processor 210 or in response to the user's operation of the up switch 112U functioning as a lighting switch as explained later. The on-off control of illumination will be discussed later.

The camera image controller 300 is constructed by, for example, an image processing integrated circuit and controls input and output of a camera image taken with the camera head 120 and performs image processing of the camera image according to the settings by the setting processor 210 and zooming and focusing processes in response to the user's operations of the zoom control switch 122 and the auto focus switch 124. The camera image is directly output to the image input-output controller 400 and is also output to the menu display controller 220. The camera image output to the image input-output controller 400 is subjected to the signal switchover by the input switch 405 and the source changeover by the source switch 406 in the image input-output controller 400 and is displayed on the external monitor, for example, the RGB analog monitor 420. The camera image output to the menu display controller 220 is set as a background image of the monitor 114 by the menu display controller 220 as explained later. The camera image is output in this manner in response to setting of the camera head 120 to the image input source by the setting processor 210. The setting of the image input source and the image display by the menu display controller 220 will be discussed later.

The switch sensing controller 240 of the setting controller 200 senses the user's operation of one of the menu switch 112M and the surrounding up, down, right, and left switches 112U, 112D, 112R, and 112L included in the switch assembly 112 and outputs a switch detection signal identifying the pressed switch to the setting processor 210. The memory reader 250 reads an image stored in a memory SD inserted in the memory card insertion mechanism 113 (see FIG. 1) and outputs the read image (memory image) according to an image display mode (a single image display mode or a thumbnail image display mode) set by the setting processor 210. The memory image is directly output to the image input-output controller 400 and is also output to the menu display controller 220. The memory image output to the image input-output controller 400 is subjected to the signal switchover by the input switch 405 and the source changeover by the source switch 406 in the image input-output controller 400 and is displayed on the external monitor. The memory image output to the menu display controller 220 is set as a background image of the monitor 114 by the menu display controller 220 as explained later. The memory image is output in this manner in response to setting of the memory SD to the image input source by the setting processor 210. The setting of the image input source and the image display by the menu display controller 220 will be discussed later.

The switch display light modulator 230 controls light modulation and lighting of the modulated light source 119 according to the setting of the image input source by the setting processor 210. The switch display light modulator 230 modulates the color of the light transmitted through the translucent window 112MW of the menu switch 112M and visually informs the user of the currently set image input source among the available options, camera, the personal computer, and the memory.

The setting processor 210 sets the image input source to be output to the external monitor in response to the switch detection signal received from the switch sensing controller 240, while outputting controls signals required for the light modulation control by the switch display light modulator 230, the switchover control of the image output by the image input-output controller 400, and the menu display control by the menu display controller 220 corresponding to the set image input source. The setting of the image input source in response to the input switch detection signal and the menu display control in response to the output control signal will be explained later in relation to the user's switch operation.

The menu display controller 220 has a menu image combining module 222 and a composite menu image output module 224 for the image display control on the monitor 114. The menu image combining module 222 combines an image (source image) from the image input source set by the setting processor 210 as the background image, that is, either the camera image from the camera head 120 or the memory image from the memory SD, with a menu image. The composite menu image output module 224 displays the resulting combined image as a composite image on the monitor 114. The menu image as a combining subject includes command icons (described later) and is generated by reading command image data stored in the ROM of the setting controller 200. The menu image combining module 222 combines the menu image with the source image only in the case of command setting based on the menu image in response to the user's operation of the menu switch 112M. In a state without combining the menu image with the source image (menu image no-display mode), the monitor 114 displays the source image (either the camera image or the memory image) set by the setting processor 210.

Figure 6:
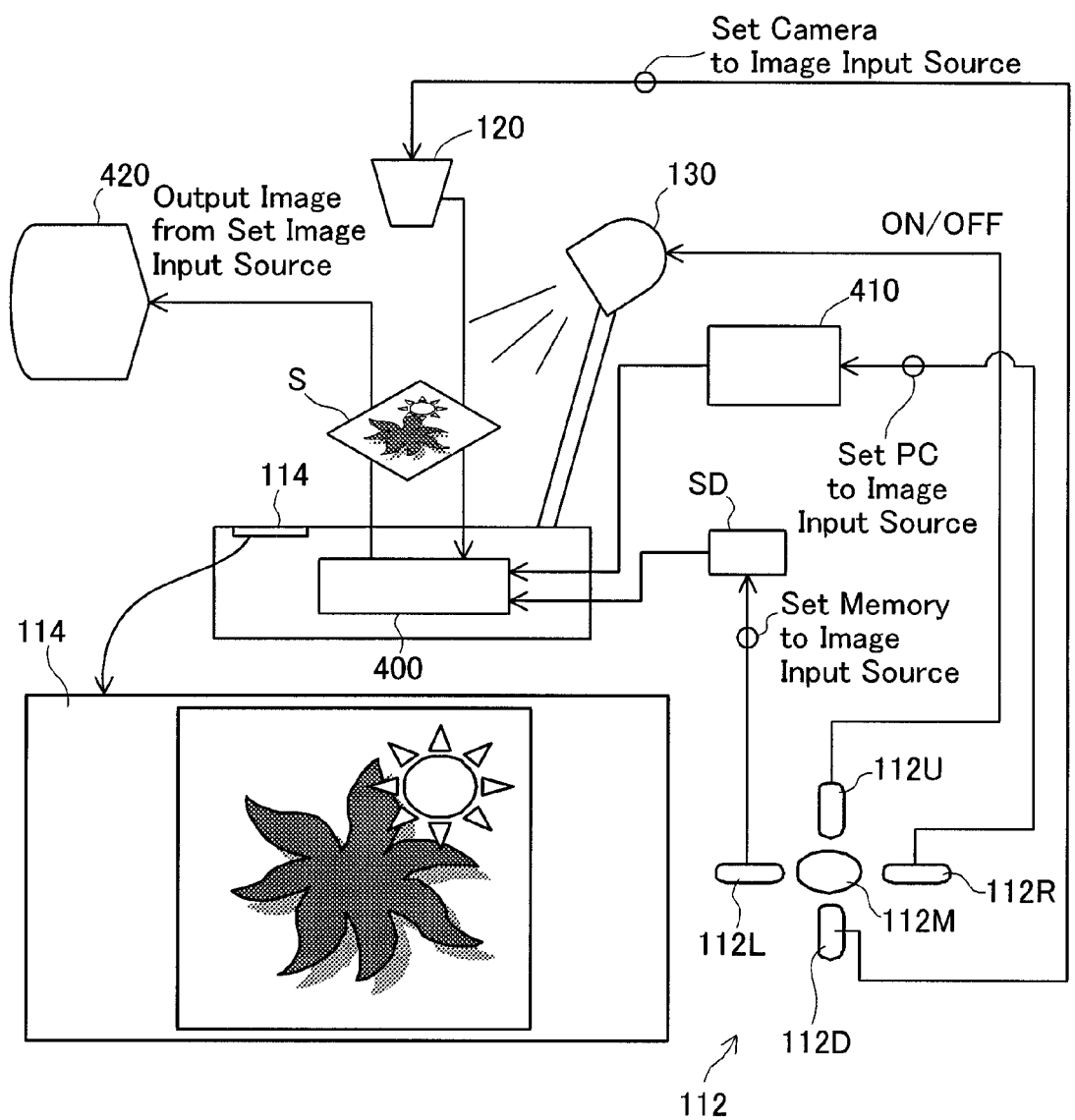
FIG. 6 schematically shows the relation of device control to circumferential switches in the switch assembly 112.

The device control and the menu display control performed by the imaging device 100 of the embodiment are discussed in relation to the user's switch operations. FIG. 6 schematically shows the relation of the device control to the circumferential switches in the switch assembly 112.

In response to the user's power-on of a main switch 110S provided on the table 110 (see FIG. 1), the image input source is set to the camera image as an initial setting in the imaging device 100. The major application of the imaging device 100 is a presentation showing the audience the camera image from the camera head 120 via the external monitor. The default image input source is accordingly the camera image for the presentation. As shown in FIG. 6, the imaging device 100 turned on by the power-on of the main switch 110S takes an image of a material S placed on the table 110 with the camera head 120 and displays the camera-taken image (camera image) on the RGB analog monitor 420 via the image input-output controller 400 as well as on the monitor 114. The moment of the user's power-on of the main switch 110S is in the menu image no-display mode. The menu display controller 220 or more specifically the menu image combining module 222 displays only the camera image input from the camera image controller 300 on the monitor 114. The monitor 114 is a liquid crystal display panel of a low resolution. The menu image combining module 222 performs image processing of the camera image corresponding to the display resolution of the monitor 114 and displays the processed camera image alone on the monitor 114.

In the menu image no-display mode, the up switch 112U and the other circumferential switches surrounding the menu switch 112M function as switches for physical device settings. When the user presses the up switch 112U in the menu image no-display mode, a corresponding switch signal is directly input into the lighting controller 500. The lighting controller 500 controls on and off illumination by the lighting unit 130 in response to the switch signal of the up switch 112U.

When the user presses the right switch 112R in the menu image no-display mode, a corresponding switch signal is directly input into the input switch 405 and the source switch 406 in the image input-output controller 400. In response to the switch signal of the right switch 112R, the image input-output controller 400 sets the PC image from the personal computer 410 to the source image and displays the PC image on the RGB analog monitor 420. In the imaging device 100 of this embodiment, the PC image from the personal computer 410 is not input into the menu display controller 220 as shown in FIG. 5 and is accordingly not displayed on the monitor 114. The PC image is generally output after a series of image processing performed by the personal computer 410 and is assumed to have no requirement for further image processing by the imaging device 100. In the case of selection of the PC image as the source image by the user's operation of the right switch 112R, the imaging device 100 of the embodiment displays the camera image from the camera head 120, instead of the PC image, on the monitor 114.

When the user presses the left switch 112L in the menu image no-display mode, a corresponding switch signal is directly input into the input switch 405 and the source switch 406 in the image input-output controller 400. In response to the switch signal of the left switch 112L, the image input-output controller 400 sets the memory image from the memory SD to the source image and displays the memory image on the RGB analog monitor 420, the digital monitor 430, or the video monitor 440. The memory image is input into the menu image combining module 222 of the menu display controller 220, is subjected to the image processing by the menu image combining module 222, and is displayed on the monitor 114. The memory SD generally stores multiple still images. In the case of setting the memory image to the source image by the user's operation of the left switch 112L and displaying the memory image on the monitor 114, multiple memory images from the memory SD are sequentially displayed in response to the user's successive operations of the left switch 112L.

The display mode of the memory image is selectively set between the single image display mode and the thumbnail image display mode for images from the memory SD as explained later. In response to the user's press of the left switch 112L in the menu image no-display mode, the memory image is displayed on the external monitor, such as the digital monitor 430, and the monitor 114 in either the single image display mode or the thumbnail image display mode set in a previous application of the imaging device 100. Multiple display options may be provided for the thumbnail image display, for example, 3×3 thumbnail image display and 4×4 thumbnail image display. For example, 3×3 thumbnail image display may be set to the default thumbnail image display mode. When the user requires a change of the image display mode from the single image display mode to the thumbnail image display mode, the 3×3 thumbnail image display is activated. In response to the user's change requirement for the setting of the thumbnail image display, the 4×4 thumbnail image display is activated. The 4×4 thumbnail image display is used for the thumbnail image display mode until the user's power-off. After the power-off, the thumbnail image display mode is returned to the 3×3 thumbnail image display as the default setting. The setting of the thumbnail image display is changed by command setting as explained later.

When the user presses the down switch 112D in the menu image no-display mode, a corresponding switch signal is directly input into the image input-output controller 400 to set the camera image from the camera head 120 to the source image. The camera image is displayed on the external monitor as well as on the monitor 114, as in the case of setting the memory image to the source image in response to the user's press of the left switch 112D or immediately after the user's power-on of the main switch 110S.

As described above, until the user's operation of the menu switch 112M after the power-on of the main switch 110S, the imaging device 100 identifies the menu image no-display mode without combining the source image with the menu image. Such identification is performed by the switch sensing controller 240 and the setting processor 210 corresponding to the user's operation or non-operation of the menu switch 112M. In the menu image no-display mode, the imaging device 100 of the embodiment causes the up, down, left, and right switches 112U, 112D, 112L, and 112R surrounding the menu switch 112M to function as physical operation keys. The up switch 112U functions as a physical operation key for setting illumination on and off as one working condition of the imaging device 100. The right switch 112R functions as a physical operation key for setting the image input source (setting the PC image to the source image) as one working condition of the imaging device 100. The left switch 112L functions as a physical operation key for setting the image input source (setting the memory image to the source image) as the working condition of the imaging device 100. The down switch 112D functions as a physical operation key for setting the image input source (setting the camera image to the source image) as the working condition of the imaging device 100. These settings are regularly used in application of the imaging device 100. The imaging device 100 of the embodiment enables the user to directly and readily set the lighting on-off condition and the image input source by the simple operations of the corresponding switches without requiring selection of command icons (discussed later). This arrangement effectively improves the usability.

Making the up switch 112U and the other circumferential switches function as the physical operation keys is explained in relation to the functional blocks shown in FIG. 5. The setting processor 210 inputting the user's switch operations via the switch sensing controller 240 has line on-off switches 211 on a control signal line connecting the up switch 112U to the lighting unit 130 and on a signal line connecting the right switch 112R, the down switch 112D, and the left switch 112L to the image input-output controller 400. In the menu image no-display mode without the user's operation of the menu switch 112M, the setting processor 210 sets the line on-off switch 211 to a line open position. In a command setting mode (explained later) with the user's operation of the menu switch 112M, the setting processor 210 sets the line on-off switch 211 to a line close position.

The major application of the imaging device 100 is a presentation as mentioned above. The imaging object of the camera head 120 is thus not restricted to the two-dimensional sheet material but may be a three-dimensional solid material. Image zooming for emphasized display to the audience is generally required. In the imaging device 100 of the embodiment, the switches for the auto focus function and zooming regularly used in the course of taking an image with the camera head 120 are provided as the zoom control switch 122 and the auto focus switch 124 on the camera head 120. The imaging device 100 of the embodiment enables the user to readily set the auto focus function and the zoom in the course of taking an image of an imaging object by the simple operations of these physical switches provided on the camera head 120. This arrangement effectively improves the usability.

The setting processor 210 of the imaging device 100 inputs the switch signals of the circumferential switches via the switch sensing controller 240 in the menu image no-display mode. The setting processor 210 identifies the image input source set by the operations of the right switch 112R, the down switch 112D, and the left switch 112L among the circumferential switches in the menu image no-display mode, and controls light modulation in the modulated light source 119 corresponding to the identified image input source to make the color of the modulated light transmitted through the translucent window 112MW (see FIG. 3). The imaging device 100 of the embodiment enables the user to recognize the currently set image input source by the color of the light transmitted through the translucent window 112MW even after setting the image input source by the operations of the right switch 112R, the down switch 112D, and the left switch 112L. This arrangement effectively improves the usability.

The multiple memory images are sequentially displayed in response to the user's successive operations of the left switch 112L in the menu image no-display mode. The setting processor 210 inputs continual switch signals representing the user's successive operations of the left switch 112L in the menu image no-display mode via the switch sensing controller 240 and sequentially feeds the memory images read by the memory reader 250 in response to the input of the continual switch signals. The memory images are thus sequentially displayed in response to the user's successive operations of the left switch 112L.

Figure 7:
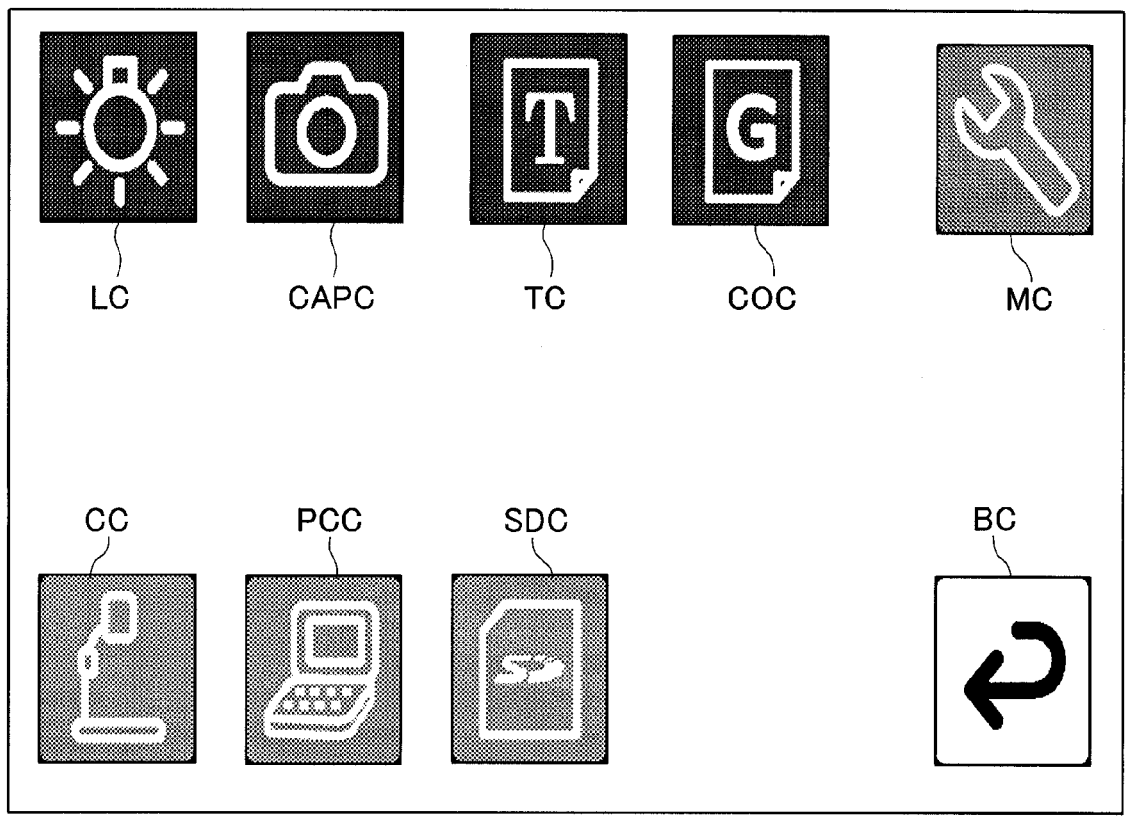
FIG. 7 shows a menu image including command icons in a top layer (top menu).

The description regards the device settings by selection of command icons in the imaging device 100. FIG. 7 shows a menu image including command icons in a top layer (top menu). As shown in FIG. 7, the top menu includes two rows of command icons. The lower row of the top menu includes a camera command icon CC representing the camera image as one option of the source image, a PC command icon PCC representing the PC image as another option of the source image, a memory command icon SDC representing the memory image as still another option of the source image, and a back command icon BC. The back command icon BC is selected to return the state without the device settings by selection of command icons in the menu image.

The upper row of the top menu includes a lighting command icon LC, a capture command icon CAPC, a text command icon TC, a color command icon COC, and an advanced settings command icon MC.

Selection of the lighting command icon LC in the menu image sets on and off illumination by the lighting unit 130. Selection of the capture command icon CAPC in the menu image captures a displayed image from the set image input source and stores the captured image into an internal or external memory unit. When the source image is a text image, selection of the text command icon TC in the menu image sets a text image mode suitable for display of the text image. When the source image is a color image, selection of the color command icon COC in the menu image sets a color image mode suitable for display of the color image. The advanced settings command icon MC is enabled after setting either the camera image or the memory image to the source image by selection of the camera command icon CC or the memory command icon SDC. Selection of the advanced settings command icon MC in the menu image allows various advanced settings required for output and display of the camera image or the memory image.

In the case of selection of the text command icon TC, the advanced settings in the text image mode, for example, edge enhancement and sharpness, are specified by selection of corresponding command icons in lower hierarchical menu images described later. In response to selection of the text command icon TC in the top menu, the text image is displayed according to the specified advanced settings. The advanced settings in the color image mode are similarly specified in the case of selection of the color command icon COC.

The top menu is not displayed on the monitor 114 without the user's operation of the menu switch 112M and is displayed on the monitor 114 in response to the user's operation of the menu switch 112M as explained below. For convenience of explanation, it is assumed that the currently set source image is the camera image from the camera head 120.

Figure 8:
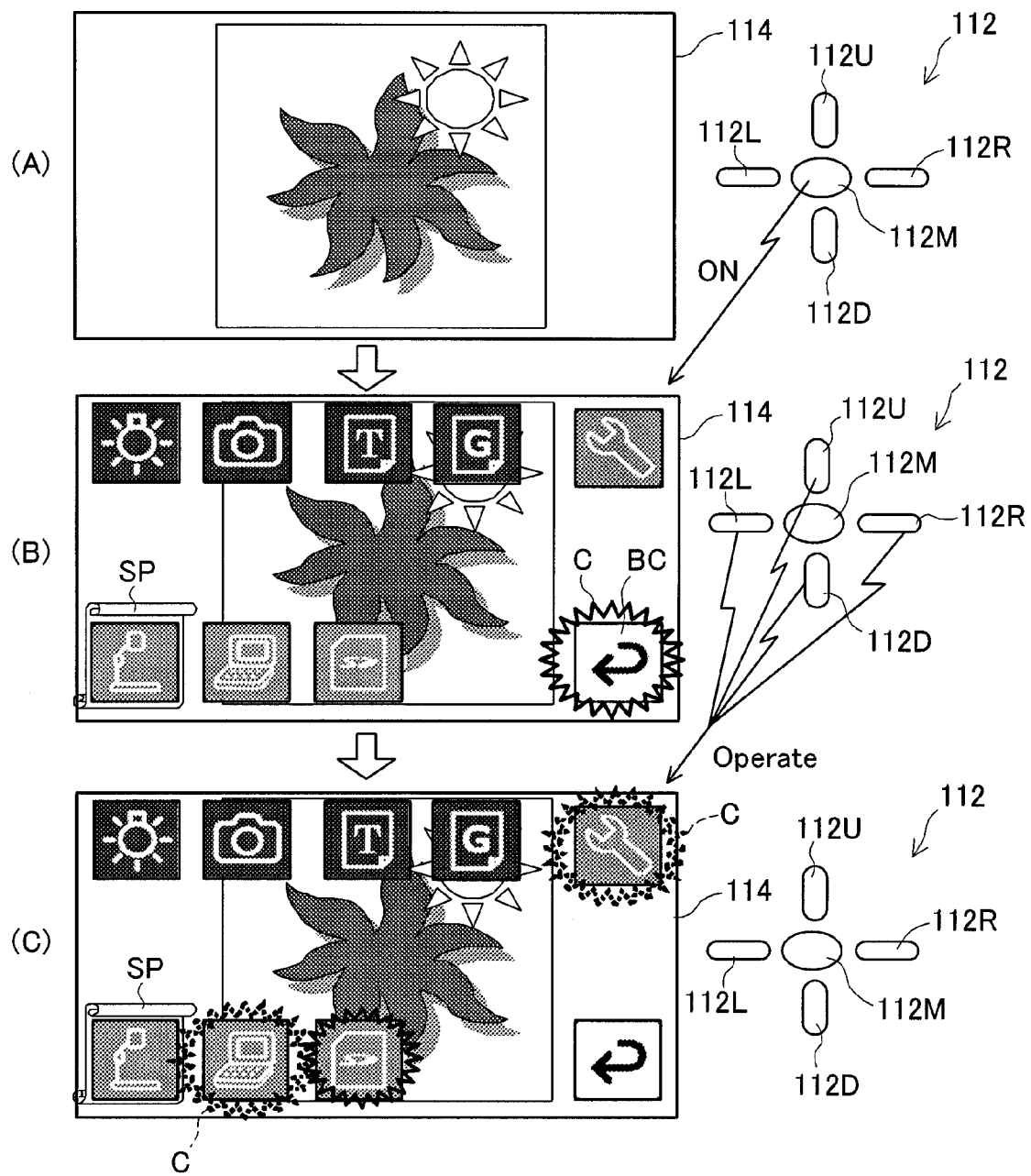
FIG. 8 shows display of a top menu in response to the user's operation of a menu switch 112M and selection of command icons in response to the operations of a left switch 112L and other relevant circumferential switches.

FIG. 8 shows display of the top menu in response to the user's operation of the menu switch 112M and selection of command icons in response to the operations of the left switch 112L and the other relevant circumferential switches. When the imaging device 100 is turned on by the user's power-on of the main switch 110S, the setting processor 210 continuously monitors the user's operation of the menu switch 112M represented by a switch signal from the switch sensing controller 240. In response to the user's operation of the menu switch 112M, the setting processor 210 assumes that the user requires the device settings with the menu image including the command icons and outputs a top menu display signal to the menu display controller 220. The menu image non-display mode is active before output of the top menu display signal. Only the camera image from the camera head 120 is accordingly displayed on the monitor 114 as shown in FIG. 8(A).

In response to input of the top menu display signal, the menu image combining module 222 of the menu display controller 220 receives the camera image as the currently set source image from the camera image controller 300, reads out command image data representing the command icons to be included in the top menu from the memory, and aligns the command icons to generate the top menu image shown in FIG. 7. The menu image combining module 222 then lays the top menu image on the background camera image and outputs the resulting composite image to the monitor 114 via the composite menu image output module 224. The top menu laid on the background camera image is accordingly displayed on the monitor 114 as shown in FIG. 8(B).

During display of the top menu combined with the background image (camera image) on the monitor 114, the command setting mode is active in the imaging device 100. In the command setting mode, the menu switch 112M functions as a set key, and the up switch 112U and the other circumferential switches surrounding the menu switch 112M function as cursor shift keys to shift a cursor C for selection of a desired command icon. The up switch 112U and the other circumferential switches surrounding the menu switch 112M function as physical operation keys for setting the working conditions of the imaging device 100 in the menu image no-display mode as discussed above, while functioning as command operation keys for shifting the cursor C and selecting a desired command icon in the command setting mode.

FIG. 8(B) shows an image display state (initial state) on the monitor 114 immediately after the display of the top menu in response to the user's operation of the menu switch 112M. In the initial state, the cursor C is located at the position of the back command icon BC. In response to the user's another operation of the menu switch 112M in this initial state, the setting processor 210 identifies selection and setting of the back command icon BC and deletes the display of the top menu including the command icons on the monitor 114. This inactivates the command setting mode and activates the menu image no-display mode without the display setting by selection of command icons in the imaging device 100. The display on the monitor 114 is accordingly returned to the state of FIG. 8(A) and shows only the camera image. Until the user's another operation of the menu switch 112M, the up switch 112U and the other circumferential switches function as the physical operation keys for setting the working conditions, for example, the lighting on-off condition, in the imaging device 100.

In the top menu displayed on the monitor 114 as shown in FIG. 8(B), the currently set image input source is visually recognizable as a current image input source SP. For example, the camera command icon CC corresponding to the camera image currently selected as the source image may be outlined as the current image input source SP as shown in FIG. 8(B) or may be highlighted with a darker color than the color of the other command icons. The discriminative display of the relevant command icon as the current image input source SP in the top menu in combination with the color display of the modulated light emitted from the modulated light source 119 and transmitted through the translucent window 112MW enables the user to readily recognize the currently set image input source. The outlined display or the highlighted display of the camera command icon CC as the current image input source is implemented by a known image processing technique, for example, reading and combining an outline image with the relevant command icon or adjustment of the luminance, applied in the course of reading the command image data from the memory.

In the command setting mode with display of the top menu as shown in FIG. 8(B), the user's successive operations of the left switch 112L among the circumferential switches sequentially shift the cursor C leftward from the position of the back command icon BC. After the cursor C reaches the leftmost command icon in the lower row of the top menu, the user's another operation of the left switch 112L shifts the cursor C to the leftmost command icon in the upper row of the top menu. Namely the cursor C is sequentially shifted from the back command icon BC clockwise through the command icons aligned in the upper row and the lower row, in response to the user's successive operations of the left switch 112L. In response to the user's successive operations of the right switch 112R, on the contrary, the cursor C is sequentially shifted from the back command icon BC counterclockwise through the command icons aligned in the upper row and the lower row.

Various functions with regard to the shift of the cursor C may be set for the up switch 112U and the down switch 112D. For example, the up switch 112U may function to shift the cursor C from the command icon in the lower row to the command icon in the upper row or in the opposite direction. The down switch 112D may function to return the cursor C from any command icon to the back command icon BC.

The shift of the cursor C in response to the operation of the corresponding switch is displayed in the following manner. The setting processor 210 monitors the user's operations of the circumferential switches in the command setting mode via the switch sensing controller 240. When the setting processor 210 sends signals representing identification of the operated circumferential switch and the frequency of the operations to the menu display controller 220, the menu image combining module 222 of the menu display controller 220 newly generates a composite image (including the command icons laid on the background image) after the shift of the cursor C and displays the generated composite image on the monitor 114.

The up switch 112U and the other circumferential switches have the functions of shifting the cursor C as explained above. In response to the user's operations of the circumferential switches in the state of FIG. 8(B), the cursor C is shifted as shown in FIG. 8(C). The menu switch 112M functions as the set key in the command setting mode as mentioned previously. When the user operates the menu switch 112M after the shift of the cursor C to the PC command icon PCC (see FIG. 7) as shown in FIG. 8(C), the PC command icon PCC is selected and set. The current image input source SP is accordingly changed from the camera image to the PC image through the switch operation monitor by the setting processor 210 and the resulting changeover of the image input source by the image input-output controller 400. The PC image set as the new current image input source SP is output via the RGB output terminal 402 to the RGB analog monitor 420 and is displayed on the RGB analog monitor 420, while not being displayed on the monitor 114 as discussed previously. The display on the monitor 114 is the top menu combined with the background camera image from the camera head 120, in place of the selected PC image.

When the user operates the circumferential switches to shift the cursor C to the memory command icon SDC (see FIG. 7) and presses the menu switch 112M in the state of FIG. 8(B), the current image input source SP is changed to the memory image. The memory image set as the new current image input source SP is displayed on the RGB analog monitor 420, the digital monitor 430, or the video monitor 440, while being used as the background image and combined with the top menu to be displayed on the monitor 114 as discussed previously. Namely the display on the monitor 114 is a composite image including the memory image as the background image of the top menu, in place of the camera image shown in FIG. 8(B) or FIG. 8(C). The composition and the display of the top menu with the memory image is performed by the menu image combining module 222 and the composite menu image output module 224 of the menu display controller 220, in the same manner as the composition and the display of the camera image with the top menu.

When the user operates the circumferential switches to shift the cursor C to one of the command icons aligned in the upper row of the top menu and presses the menu switch 112M in the state of FIG. 8(B), the setting corresponding to the command icon with the cursor C is selectively activated. For example, selection of the lighting command icon LC changes the lighting condition by the lighting unit 130 from the on condition to the off condition or from the off condition to the on condition. Selection of the capture command icon CAPC captures the source image from the currently set image input source and stores the captured image into the memory unit. Selection of the text command icon TC activates the text image mode for image display. Selection of the color command icon COC activates the color image mode for image display. The setting processor 210 performs such setting corresponding to the selected command icon.

Figure 9:
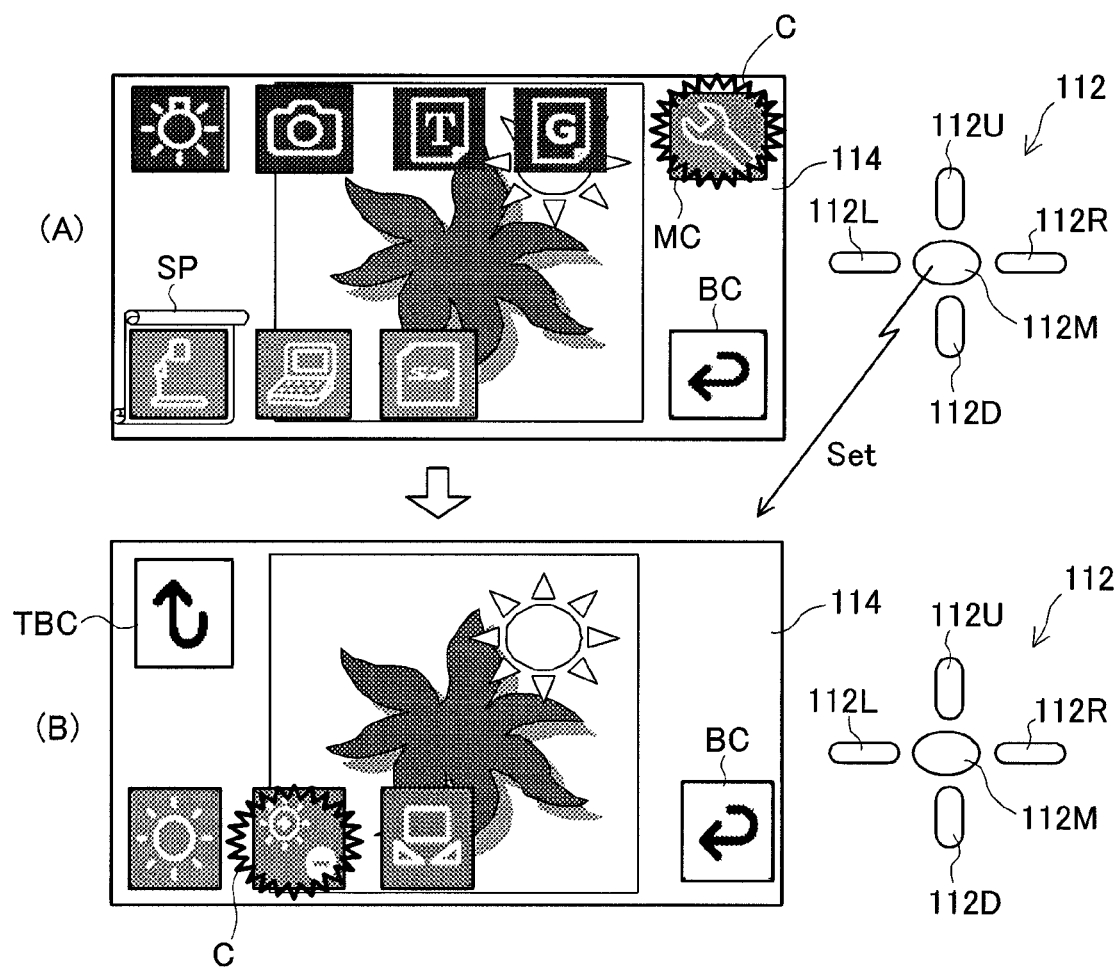
FIG. 9 shows a change of the menu image in response to selection of an advanced settings command icon MC in the case of setting a camera image to a current image input source SP.

The description regards the setting in response to selection of the advanced settings command icon MC. FIG. 9 shows a change of the menu image in response to selection of the advanced settings command icon MC in the case of setting the camera image to the current image input source SP.

The user may require the advanced device settings for image display of the camera image set to the current image input source SP. In this case, the user sets the camera image to the current image input source SP, operates the up switch 112U and the other circumferential switches to shift the cursor C to the advanced settings command icon MC, and presses the menu switch 112M as shown in FIG. 9(A). In response to the user's operations of the circumferential switches and the menu switch 112M, the setting processor 210 outputs a control signal to the menu display controller 220 to change the display on the monitor 114 from the top menu shown in FIG. 8(B) or FIG. 8(C) to a lower hierarchical menu image. The menu image combining module 222 of the menu image controller 220 receives the control signal, reads out command image data representing command icons to be included in the lower hierarchical menu image from the memory, combines the lower hierarchical menu image including the command icons with the background camera image, and the resulting combined image including the lower hierarchical menu image as a composite image on the monitor 114 as shown in FIG. 9(B). The display on the monitor 114 is accordingly changed from the top menu to the lower hierarchical menu image.

The lower hierarchical menu image includes two rows of command icons as shown in FIG. 9(B). In the lower row of the lower hierarchical menu image, the back command icon BC is located at the same position as in the top menu. The lower row also has three command icons on the left of the back command icon BC. The upper row has a top menu command icon TBC. The top menu command icon TBC is displayed on any lower hierarchical menu images including the illustrated lower hierarchical menu image of FIG. 9(B) and is selected to return the display from any lower hierarchical menu image to the top menu shown in FIG. 9(A).

Figure 10:
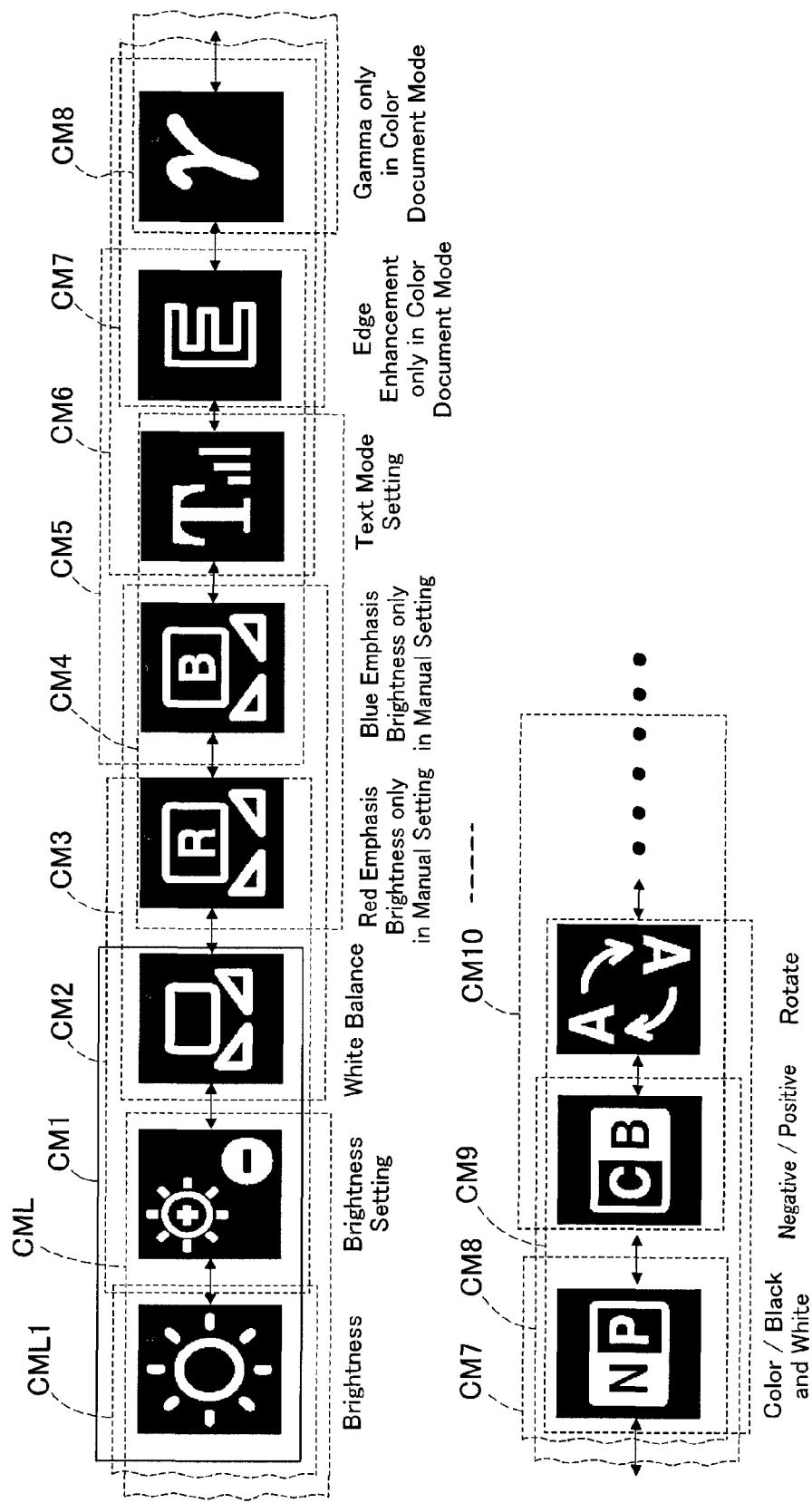
FIG. 10 shows command icons included in lower hierarchical menu images and generation of the lower hierarchical menu images by selection of the respective command icons.
Figure 11:
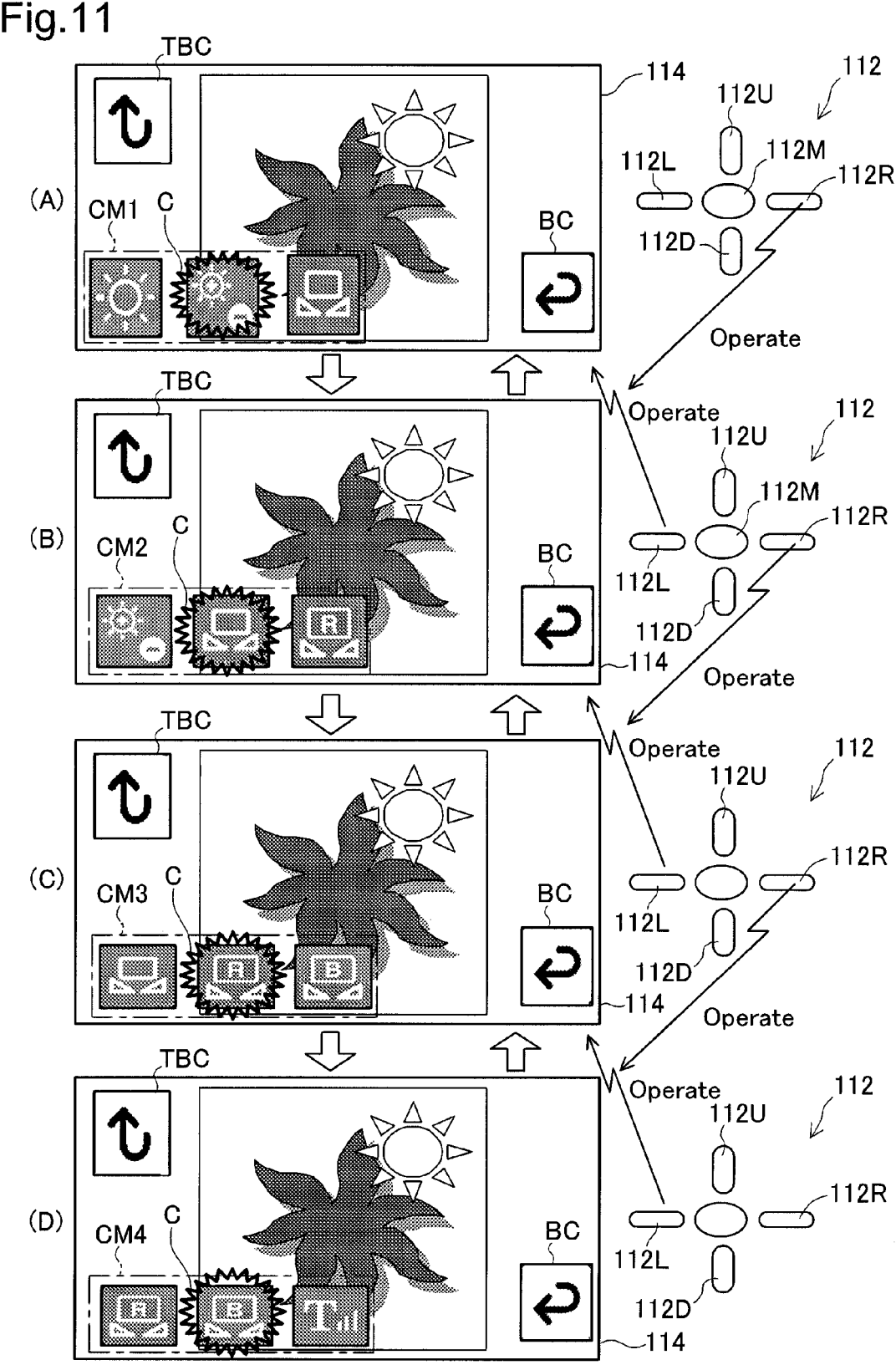
FIG. 11 shows a change of the display to a lower hierarchical menu image and a change of the display to an upper hierarchical menu image.

After the change of the display on the monitor 114 from the top menu to the lower hierarchical menu image, the circumferential switches including the right switch 112R and the menu switch 112M function as keys operated to select a desired command icon and change the display to lower hierarchical menu images. The functions of these switches are explained in relation to lower hierarchical menu images. FIG. 10 shows command icons included in the lower hierarchical menu images and generation of the lower hierarchical menu images by selection of the respective command icons. FIG. 11 shows a change of the display to a lower hierarchical menu image and a change of the display to an upper hierarchical menu image.

In the imaging device 100 of the embodiment, the number of command icons other than the top menu command icon TBC and the back command icon BC included in each lower hierarchical menu image below the top menu is restricted to three. The cursor C is fixed at the position of a center command icon of the three command icons. The center command icon is selected by the user's operation of the menu switch 112M. Namely the menu switch 112M functions as the set key to selectively set a desired command icon in any lower hierarchical menu image.

As shown in FIG. 10, the command icons included in the lower hierarchical menu images are provided as different images representing the corresponding settings required in application of the imaging device 100 and are stored in the form of command image data in the memory of the imaging device 100. The provided and stored command icons include, for example, a command icon for selecting auto brightness adjustment or manual brightness adjustment, a command icon for setting the level of the auto brightness adjustment, a command icon for selecting auto white balance adjustment or manual white balance adjustment, a command icon for setting the level of red emphasis, and a command icon for setting the level of blue emphasis as shown in FIG. 10.

Among the command icons shown in FIG. 10, three consecutive command icons constitute a first-layer command icon group CM1 to a lowermost-layer command icon group CML in each lower hierarchical menu image below the top menu. In response to a menu image display change command to the lower hierarchy layer corresponding to the user's operations of the circumferential switches (explained later), the menu image combining module 222 of the menu display controller 220 reads out command image data representing three command icons in each layer command icon group from the memory, combines a lower hierarchical menu image including the three command icons in the corresponding layer command icon group with the background camera image, and displays the resulting combined image including the lower hierarchical menu image as a composite image on the monitor 114. Each lower hierarchical menu image accordingly includes three command icons in the corresponding layer command icon group. The command icon group including three consecutive command icons as shown in FIG. 10 is sequentially changed with a change of the display to a further lower hierarchical menu image. The displayed command icons are accordingly changed one by one. The center command icon with the cursor C is thus sequentially changed with a change of the display to the further lower hierarchical menu image.

The right switch 112R and the left switch 112L among the circumferential switches function as operation keys to change the display of the menu image. The right switch 112R is operated to sequentially change the display of the menu image to a lower hierarchical layer, while the left switch 112L is operated to sequentially change the display of the menu image to an upper hierarchical layer. Namely the display of the menu image is changed to a lower hierarchical layer or to an upper hierarchical layer, in response to every operation of the right switch 112R or the left switch 112L as shown in FIG. 11.

The down switch 112D functions as an operation key to return the cursor C to the back command icon BC, and the up switch 112U functions as an operation key to return the cursor C to the top menu command icon TBC. The menu switch 112M functions as a command icon set key. In response to the user's operation of the menu switch 112M in each lower hierarchical menu image, the center command icon among the three consecutive command icons included in the lower hierarchical menu image is selected. The setting corresponding to the selected command icon is then performed. For example, in the lower hierarchical menu image of FIG. 9(B), the center command icon is selected to set the level of the auto brightness adjustment. For setting the level of the auto brightness adjustment, for example, a pull-down menu is opened on the monitor 114. The user may set the level of the auto brightness adjustment based on the pull-down menu. The setting processor 210 adjusts the device settings based on the setting corresponding to the selected command icon.

When the user presses the menu switch 112M after the shift of the cursor C to the back command icon BC by the operation of the down switch 112D, the setting processor 210 deletes all the command icons displayed on the monitor 114. This inactivates the command setting mode and activates the menu image no-display mode in the imaging device 100. The display on the monitor 114 is accordingly returned to the state of FIG. 8(A) and shows only the camera image. Until the user's another operation of the menu switch 112M, the up switch 112U and the other circumferential switches function as the physical operation keys for setting the working conditions, for example, the lighting on-off condition, in the imaging device 100 as described previously.

When the user presses the menu switch 112M after the shift of the cursor C to the top menu command icon TBC by the operation of the up switch 112U, the setting processor 210 sends a control signal to the menu display controller 220 to change the display from the lower hierarchical menu image to the top menu. The display on the monitor 114 is accordingly changed to the top menu shown in FIG. 8(B). The user may then reset the image input source as discussed previously.

Figure 12:
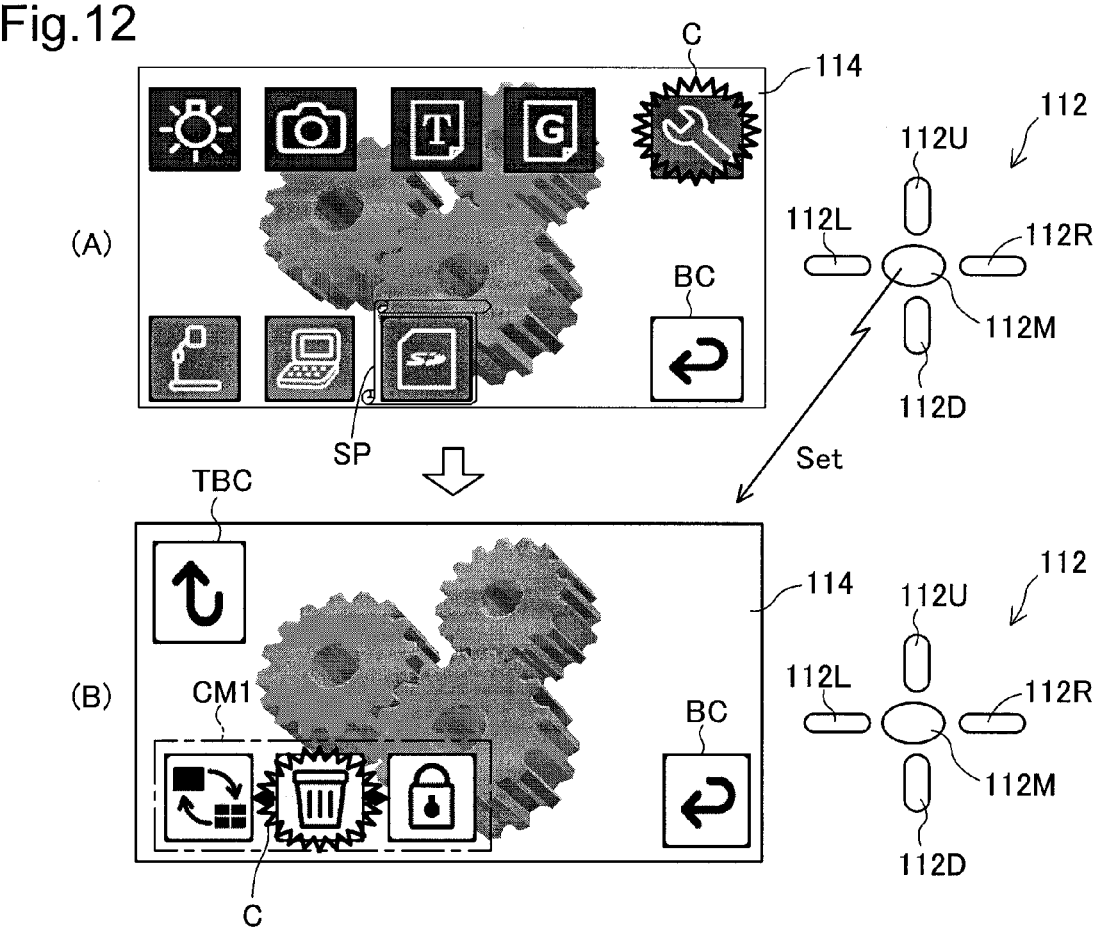
FIG. 12 shows a change of a menu image in response to selection of the advanced settings command icon MC in display of a memory image set to the current image input source SP in a single image display mode.
Figure 13:
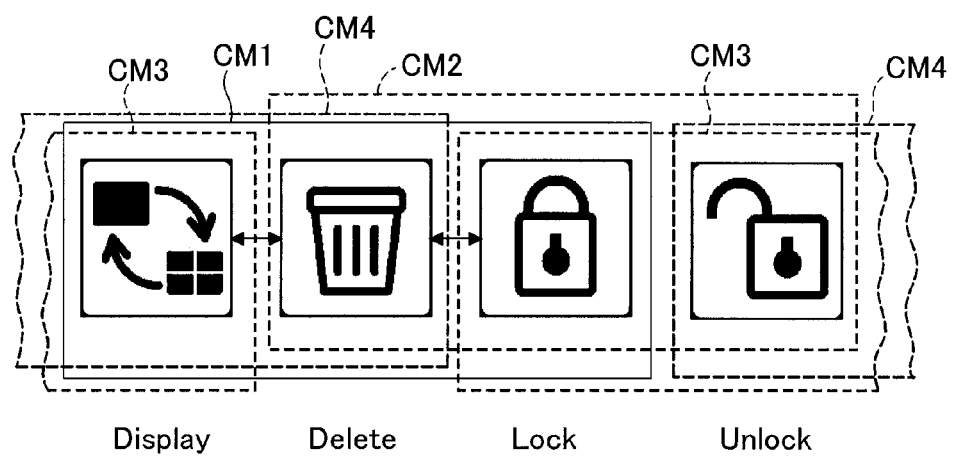
FIG. 13 shows command icons included in lower hierarchical menu images and generation of the lower hierarchical menu images by selection of the respective command icons in display of a memory image set to the current image input source SP in the single image display mode.
Figure 14:
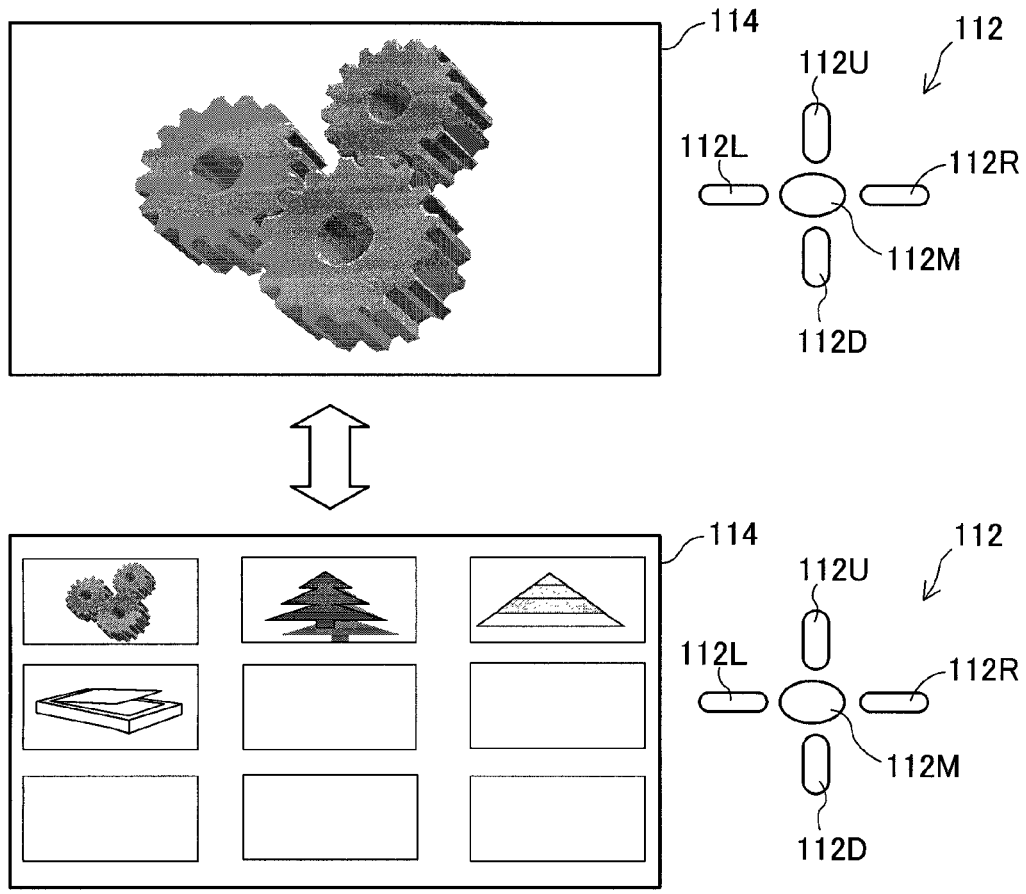
FIG. 14 shows a changeover of image display accompanied by a mode switchover for memory image display.
Figure 15:
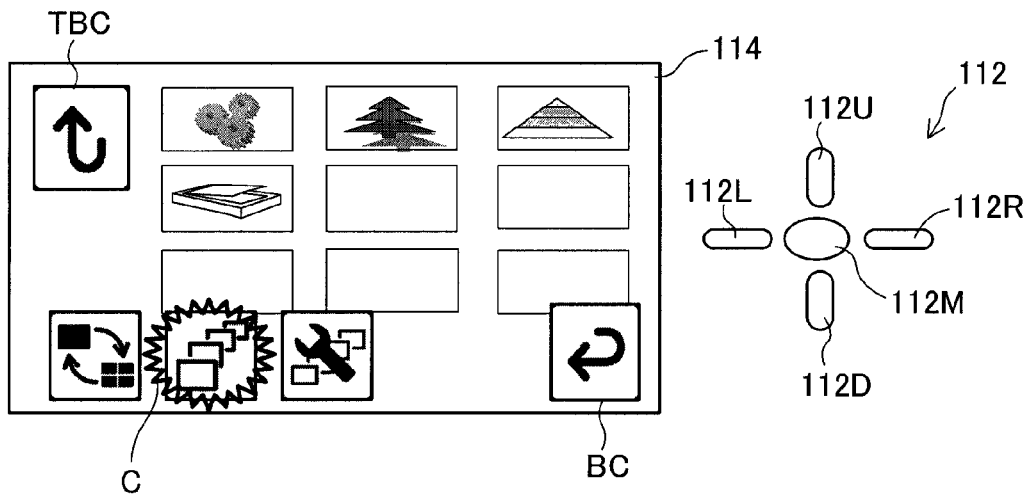
FIG. 15 shows a menu image in display of a memory image set to the current image input source SP in a thumbnail image display mode.

The description regards the image display in response to selection of the advanced settings command icon MC in the case of setting the memory image to the current image input source SP. The memory images are often still images. In the case of display of such memory images on the external monitor, the imaging device 100 of the embodiment has a single image display mode to display only one image at one time and a thumbnail image display mode to display multiple thumbnail images aligned horizontally and vertically. There is no change of the image display mode in the case of displaying the camera image on the external monitor. The device settings for the memory image accordingly adopt a different menu image structure from the structure of the menu image combined with the camera image. FIG. 12 shows a change of a menu image in response to selection of the advanced settings command icon MC in display of a memory image set to the current image input source SP in the single image display mode. FIG. 13 shows command icons included in lower hierarchical menu images and generation of the lower hierarchical menu images by selection of the respective command icons in display of a memory image set to the current image input source SP in the single image display mode. FIGS. 12 and 13 are respectively equivalent to FIGS. 9 and 10 discussed previously. FIG. 14 shows a changeover of image display accompanied by a mode switchover for the memory image display. FIG. 15 shows a menu image in display of a memory image set to the current image input source SP in the thumbnail image display mode.

As described previously, either the single image display mode or the thumbnail image display mode is set for the memory image display. The set image display mode, that is, either the single image display mode or the thumbnail image display mode, is kept even after a power-off of the main switch 110S in the imaging device 100 of the embodiment. This set image display mode is accordingly active at the time of a subsequent power-on of the main switch 110S. The memory image display in the single image display mode is discussed first.

The user may require the advanced device settings for image display of the memory image set to the current image input source SP in the single image display mode. The top menu displayed on the monitor 114 is a composite image of command icons with the background memory image generated by the menu image combining module 222 as shown in FIG. 12(A). Since the single image display mode is adopted, the background memory image is one of images stored in the memory SD. In this top menu, the current image input source SP is set to the memory image, and the cursor C is positioned on the advanced settings command icon MC by the user's operations of the circumferential switches. When the user presses the menu switch 112M in this state, the display on the monitor 114 is changed from the top menu of FIG. 12(A) to a lower hierarchical menu image as shown in FIG. 12(B) by the functions of the setting processor 210 and the menu display controller 220. As in the case of the camera image discussed above, the menu image combining module 222 of the menu display controller 220 reads command image data representing command icons to be included in the lower hierarchical menu image from the memory and combines the command icons with the background memory image.

As discussed above with reference to FIG. 9(B), the lower hierarchical menu image of FIG. 12(B) includes three command icons, in addition to the back command icon BC and the top menu command icon TBC. After the change of the display on the monitor 114 from the top menu to the lower hierarchical menu image, the circumferential switches and the menu switch 112M function as keys operated to select a desired command icon and change the display to lower hierarchical menu images.

In the imaging device 100 of the embodiment, four command icons shown in FIG. 13 are provided for the single image display mode of memory image display. Among the four command icons shown in FIG. 13, three consecutive command icons constitute a first-layer command icon group CM1 to a fourth-layer command icon group CM4 in each lower hierarchical menu image below the top menu. The four command icons included in respective lower hierarchical menu images are a display mode command icon for setting the image display mode of the memory image to either the single image display mode or the thumbnail image display mode, a delete command icon for deleting the memory image displayed in the single image display mode, a lock command icon for locking edition of the memory image displayed in the single image display mode, and an unlock command icon for releasing the lock. The command image data representing these command icons are stored in the memory of the imaging device 100. As explained above, the right switch 112R is operated to sequentially change the display of the menu image to a lower hierarchical layer, while the left switch 112L is operated to sequentially change the display of the menu image to an upper hierarchical layer.

As the display of the menu image is changed from the hierarchy level of FIG. 12(B) to a lower hierarchy level by the operation of the corresponding circumferential switch, the display mode command icon is shifted to the center command icon with the cursor C positioned thereon. In this state, when the user operates the menu switch 112M to set the display mode command icon, the image display mode is changed from the single image display mode to the thumbnail image display mode. Each operation of the menu switch 112M with the cursor C positioned on the display mode command icon alternately changes the display between the single image display mode and the thumbnail image display mode as shown in FIG. 14. The lower hierarchical menu image of FIG. 12(B) including the single memory image as the background is accordingly changed to another lower hierarchical menu image of FIG. 15 including thumbnail memory images as the background. The menu image combining module 222 reads thumbnail images from the memory of the imaging device 100 and combines the menu image with the thumbnail images as the background to generate the composite image shown in FIG. 15. In order to prevent overlap of thumbnail images in a lower-most row with the command icons in the menu image, the thumbnail images as the background are wholly contracted and are then combined with the menu image.

In display of the thumbnail images in response to selection of the display mode command icon, the 3×3 thumbnail image display and the 4×4 thumbnail image display are provided as the display options as mentioned previously. In response to selection of the display mode command icon, for example, a pull-down menu is opened above the display mode command icon. The pull-down menu includes a single image display command, a 3×3 thumbnail image display command, and a 4×4 thumbnail image display command as menu options. The user may select a desired command by operating the up switch 112U or the down switch 112D. In response to the user's selection of the 3×3 thumbnail image display command in the pull-down menu, the display is changed from the single image display to the 3×3 thumbnail image display as shown in FIG. 14. In response to the user's selection of the 4×4 thumbnail image display command in the pull-down menu, the display is changed from the 3×2 thumbnail image display of FIG. 14 to the 4×4 thumbnail image display. The menu image combining module 222 reads an image of the pull-down menu from the memory of the imaging device 100 and combines the menu image including the pull-down menu image with the thumbnail images as the background.

Figure 16:
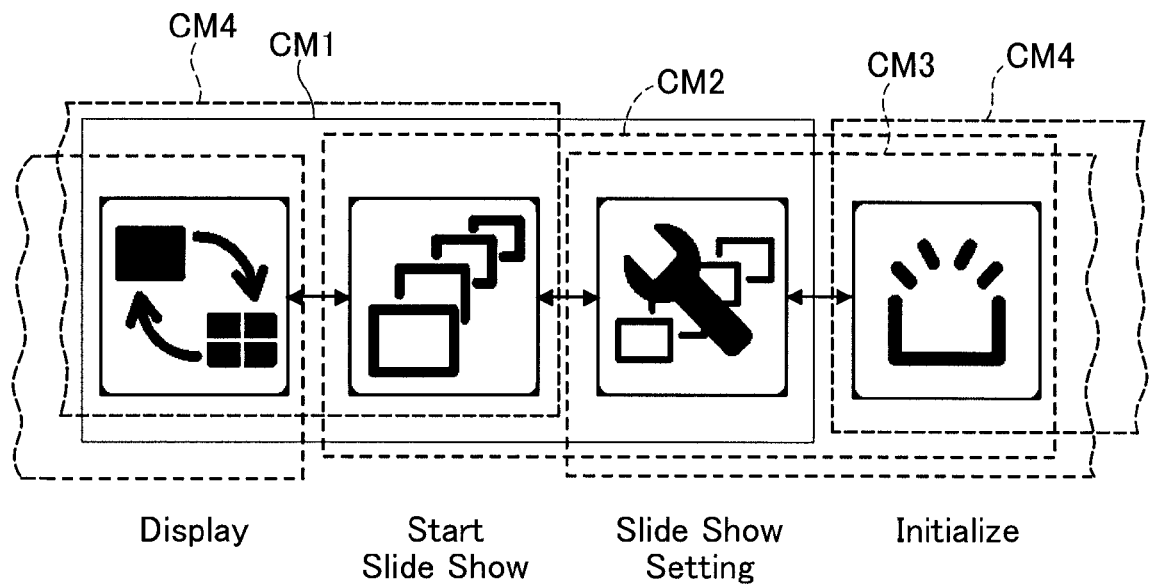
FIG. 16 shows command icons included in lower hierarchical menu images and generation of the lower hierarchical menu images by selection of the respective command icons in display of memory images set to the current image input source SP in the thumbnail image display mode.
Figure 17:
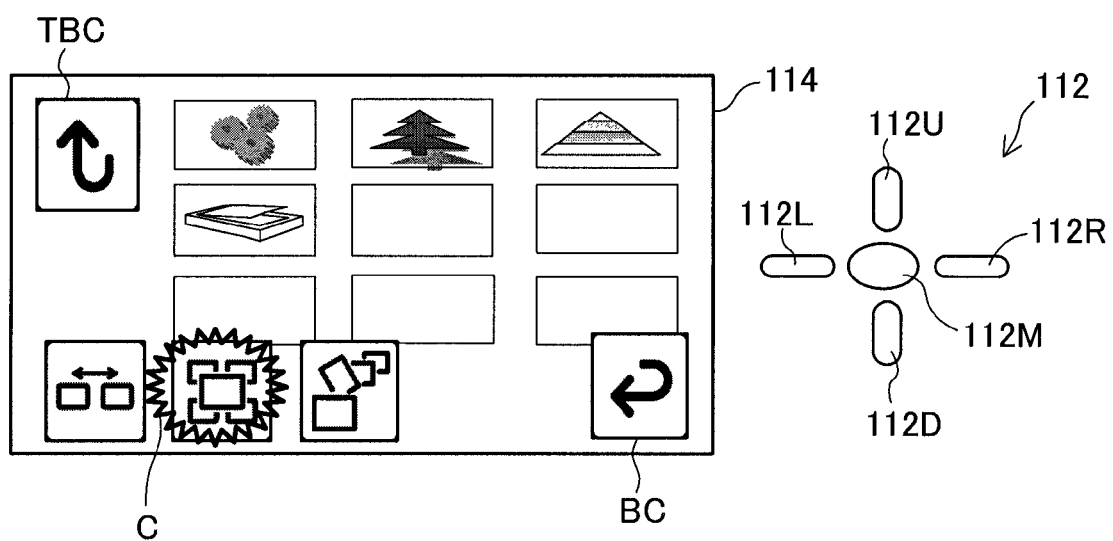
FIG. 17 shows a further lower hierarchical menu image in the thumbnail image display mode.

The advanced settings in the thumbnail image display mode are naturally different from those in the single image display mode. As the background image of the composite menu image is changed from the single image to the thumbnail images, the resulting composite menu image is changed as shown by the comparison between FIG. 12(B) and FIG. 15. The menu image combining module 222 reads command image data representing command icons to be included in the menu image for the thumbnail image display from the memory and combines the command icons with the thumbnail images as the background to generate the composite menu image as shown in FIG. 15. FIG. 16 shows command icons included in lower hierarchical menu images and generation of the lower hierarchical menu images by selection of the respective command icons in display of memory images set to the current image input source SP in the thumbnail image display mode. FIG. 16 is equivalent to FIG. 13. FIG. 17 shows a further lower hierarchical menu image in the thumbnail image display mode.

In the imaging device 100 of the embodiment, four command icons shown in FIG. 16 are provided for the thumbnail image display mode of memory image display. Among the four command icons shown in FIG. 16, three consecutive command icons constitute a first-layer command icon group CM1 to a fourth-layer command icon group CM4 in each lower hierarchical menu image below the top menu. The four command icons included in respective lower hierarchical menu images are a slide show command icon for starting a slide show of the displayed thumbnail images, a slide show setting command icon for specifying the settings for the slide show, and an initialization command icon for initialization of returning the thumbnail image display to the single image display, in addition to the display mode command icon explained above. The command image data representing these command icons are stored in the memory of the imaging device 100. As explained above, the right switch 112R is operated to sequentially change the display of the menu image to a lower hierarchical layer, while the left switch 112L is operated to sequentially change the display of the menu image to an upper hierarchical layer.

Figure 18:
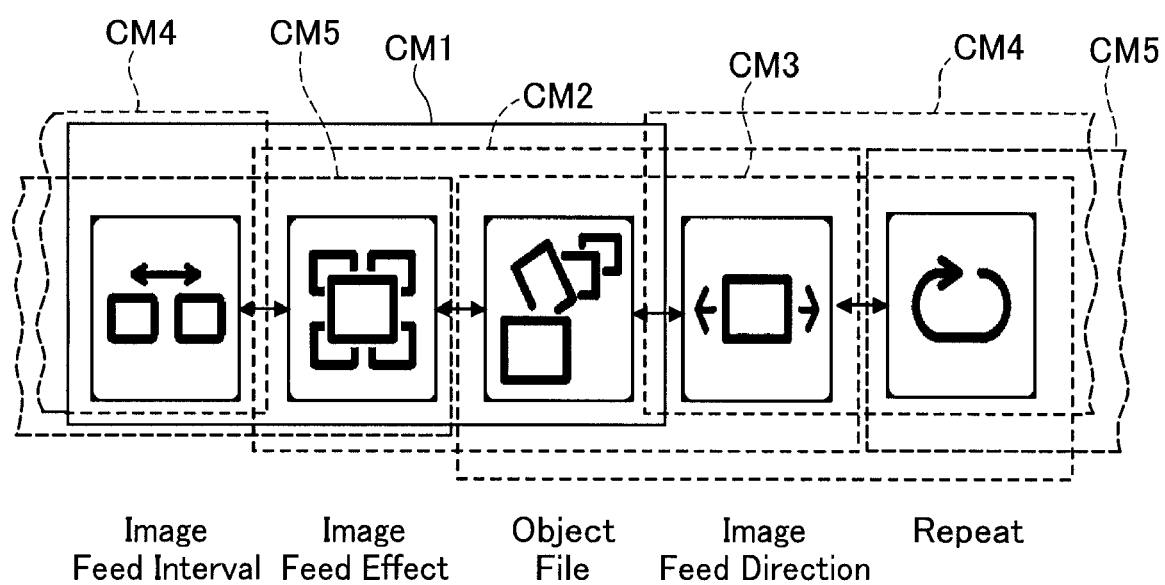
FIG. 18 shows command icons included in lower hierarchical menu images for a slide show and generation of the lower hierarchical menu images by selection of the respective command icons.

As the display of the menu image is changed from the hierarchy level of FIG. 15 to a lower hierarchy level by the operation of the corresponding circumferential switch, the slide show setting command icon is shifted to the center command icon with the cursor C positioned thereon. In this state, when the user operates the menu switch 112M to set the slid show setting command icon, the display is changed to a further lower menu image including command icons required for settings of the slide show as shown in FIG. 17. The menu image combining module 222 reads command image data representing the command icons from the memory of the imaging device 100 and combines the command icons with the thumbnail images as the background to generate the composite menu image as shown in FIG. 17. FIG. 18 shows command icons included in lower hierarchical menu images for the slide show and generation of the lower hierarchical menu images by selection of the respective command icons.

In the imaging device 100 of the embodiment, five command icons shown in FIG. 18 are provided for the slide show of the memory image display. Among the five command icons shown in FIG. 18, three consecutive command icons constitute a first-layer command icon group CM1 to a fifth-layer command icon group CM5 in each lower hierarchical menu image below the menu image of FIG. 15. The five command icons included in respective lower hierarchical menu images are an image feed interval command icon for setting the image feed interval for the slide show, an image feed effect setting command icon for setting the image feed effect, a file setting command icon for setting an object file as the subject of the slide show in the memory SD, an image feed direction command icon for setting either a normal image feed direction or a reverse image feed direction for the slide show, and a repeat command icon for setting a repeat of the slide show. The command image data representing these command icons are stored in the memory of the imaging device 100. As explained above, the right switch 112R is operated to sequentially change the display of the menu image to a lower hierarchical layer, while the left switch 112L is operated to sequentially change the display of the menu image to an upper hierarchical layer.

As explained above, in response to the user's operation of the menu switch 112M, the imaging device 100 of the embodiment is set in the command setting mode for the device settings based on the menu image. The composite image of the command icons with the camera image or the memory image from the current image input source SP as the background is then displayed as a top menu on the monitor 114. In the command setting mode, the up switch 112U, the down switch 112D, the right switch 112R, and the left switch 112L surrounding the menu switch 112M are operated to select a desired command icon and change the display of the menu image to a lower hierarchical level or to an upper hierarchical level. When the user selects a desired command icon by the operations of these circumferential switches and presses the menu switch 112M to set the selected command icon, the device setting is enabled corresponding to the set command icon.

In response to selection of the back command icon BC in the menu image of each hierarchical layer displayed on the monitor 114, the imaging device 100 inactivates the command setting mode and activates the menu image no-display mode with no display of the composite menu image on the monitor 114. In the menu image no-display mode, the camera image or the memory image from the current image input source SP as the background image is not combined with the menu image, and the display on the monitor 114 is only the camera image or the memory image from the current image input source SP. In the menu image no-display mode without combining the source image with the menu image, the up switch 112U functions as the physical operation key for setting illumination on and off as one working condition of the imaging device 100. The right switch 112R functions as the physical operation key for setting the image input source (setting the PC image to the source image) as one working condition of the imaging device 100. The left switch 112L functions as the physical operation key for setting the image input source (setting the memory image to the source image) as the working condition of the imaging device 100. The down switch 112D functions as the physical operation key for setting the image input source (setting the camera image to the source image) as the working condition of the imaging device 100. Namely the circumferential switches used for selection of a desired command icon in the command setting mode are used as the physical operation keys for setting the working conditions of the imaging device 100 in the menu image no-display mode. This dual-purpose use of the circumferential switches desirably decreases the total number of switches required in the imaging device 100. These circumferential switches are provided on the inclined surface 110FS of the table 110 for the improved usability.

The lighting on-off setting and the source image setting are regularly performed in application of the imaging device 100. The imaging device 100 of the embodiment enables the user to directly and readily set the lighting on-off condition and the image input source by the simple operations of the corresponding switches in the menu image no-display mode. This arrangement effectively improves the usability.

In the command setting mode, the menu image including the command icons is combined with the camera image or the memory image from the current input image source SP as the background image and is displayed on the monitor 114. The composite memory image of the camera image or the memory image as the background display on the monitor 114 enables the user to check the result of the device setting specified by the command icon selected by the operation of the corresponding circumferential switch. This arrangement also effectively improves the usability.

In the imaging device 100 of the embodiment, the up switch 112U, the down switch 112D, the right switch 112R, and the left switch 112L having both the functions as the physical operation keys in the menu image no-display mode and the switches for selecting a desired command icon in the command setting mode are located to surround the menu switch 112M. Such concentration of the switches improves the usability.

In the command setting mode with display of the composite menu image on the monitor 114, the display of the menu image is changeable in a hierarchical manner from the top menu of FIG. 8(B) as the menu image of the top layer. The displayed top menu has the multiple command icons including the camera command icon CC, the PC command icon PCC, the memory command icon SDC, and the lighting command icon LC. The user can select a desired command icon among the displayed multiple command icons by the operations of the relevant circumferential switches. This arrangement enables the user to set the image input source and the lighting on-off condition in the command setting mode, as well as to set the image input source and the lighting on-off condition by the operations of the circumferential switches functioning as the physical operation keys in the menu image no-display mode, thus improving the usability.

The display of the menu image including command icons on the monitor 114 is changeable in a hierarchical manner. The menu image of any hierarchical level has the back command icon BC to delete the display of the command icons and return the display to the top menu (see FIGS. 8, 11, 12, 15, and 17). Even during the device settings by selection of command icons in any lower hierarchical menu image in the command setting mode, the user's selection of the back command image BC immediately returns the state of the imaging device 100 from the command setting mode to the menu image no-display mode. Any lower hierarchical menu image below the top menu has the top menu command icon TBC to return the display on the monitor 114 to the top menu. Even during the device settings by selection of command icons in any lower hierarchical menu image, the user's selection of the top menu command icon TBC immediately returns the display on the monitor 114 to the top menu. The top menu includes the unique command icons for setting the image input source and the lighting on-off condition, which are not included in any lower hierarchical menu images. The return of the display on the monitor 114 to the top menu enables the user to change the settings of the image input source and the lighting on-off condition in the course of the device settings.

In the imaging device 100 of the embodiment, the display on the monitor 114 is the composite image of the menu image including the command icons with the camera image or the memory image from the current image input source SP as the background image. The user can thus operate the relevant circumferential switches for the device settings, while visually checking the composite menu image including the camera image or the memory image from the current image input source SP as the background on the monitor 114. The camera image or the memory image included as the background in the composite menu image displayed on the monitor 114 is image from the current image input source SP set at the moment of the operations of the circumferential switches for the device settings. The user can operate the switches for the device settings, while visually checking the image from the current image input source SP as the background of the composite menu image displayed on the monitor 114 in the course of a presentation with replacement of imaging objects. This arrangement effectively prevents the user from feeling odd or uncomfortable and enhances the usability for the device settings.

In the presentation of the image from the set image input source to the audience, only the camera image, the memory image, or the PC image set to the current image input source SP is displayed on the external monitor, while the menu image is not shown on the external monitor. This arrangement desirably prevents the display of the menu image from damaging the effect of the presentation given to the audience.

The embodiment and its applications discussed above are to be considered in all aspects as illustrative and not restrictive. There may be many modifications, changes, and alterations without departing from the scope or spirit of the main characteristics of the present invention. For example, the imaging device 100 of the embodiment excludes the PC image from the subject of composition with the menu image and outputs the PC image from the personal computer 410 to only the RGB analog monitor 420 via the RGB output terminal 402. The PC image may, however, be output to the menu display controller 220 to be combined as a background image with the menu image. The composite image of the menu image with the background PC image may include the command icons, which are included in the composite image of the menu image with the camera image or the memory image. The composite image of the PC image may additionally include command icons regarding the settings of the PC image. The PC image may be subjected to image processing specified by a selected command icon in the menu image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. An imaging device comprising:
   a camera unit constructed to take an image in a predetermined imaging area;
   a display unit used for image display;
   a command display module configured to generate a composite image by combining a camera-taken image output from the camera unit with a menu image including multiple command icons, which are to be selected for device settings, and to display the generated composite image on the display unit;
   a command operation unit provided on the imaging device and operated to select one of the multiple command icons included in the menu image of the composite image displayed on the display unit;
   a processor configured to perform a processing operation specified by the selected command icon; and
   an output processing module configured to continuously feed the camera-taken image output from the camera unit to an external display device without combining with the menu image.
2. The imaging device in accordance with claim 1, the imaging device further having:
   an image input module configured to input an image,
   wherein the command display module combines the menu image, which includes multiple image selection command icons corresponding to the camera-taken image and an input image by the image input module, with an image corresponding to one of the multiple image selection command icons in the menu image selected by an operation of the command operation unit to generate the composite image and displays the generated composite image on the display unit, and the output processing module outputs the image corresponding to the selected image selection command icon to the external display device.

3. The imaging device in accordance with claim 2, wherein the image input module reads an image as the input image from a storage medium for storing at least one image.

4. The imaging device in accordance with claim 1, wherein the command display module displays an initial image, which is the camera-taken image to the display unit without combining with the menu image, when an user turns on a main switch, and displays the composite image in response to the user's turn-on of a menu switch.

5. The imaging device in accordance with claim 1, wherein the command display module combines the multiple command icons at an upper row of the menu.

6. The imaging device in accordance with claim 5, wherein the multiple command icons include a lighting command icon for setting on and off illumination by a lighting unit, a capture command icon for capturing the camera-taken image output from the camera unit and storing the captured image into a memory unit, a text command icon for setting a text image mode suitable for display of the text image, a color command icon for setting a color image mode suitable for display of the color image, and an advanced settings command icon for allowing various advanced settings required for output and display of the camera-taken image.

7. The imaging device in accordance with claim 1, wherein the camera unit outputs a taken image to both the command display module and the output processing module.

8. The imaging device in accordance with claim 1, wherein both the command display module and the output processing module receive the image taken by the camera unit.

* * * * *